US010519269B2

(12) United States Patent
Zupancic et al.

(10) Patent No.: US 10,519,269 B2
(45) Date of Patent: Dec. 31, 2019

(54) LAMINATING ADHESIVE—POLYESTER-POLY CARBONATE-POLYOL SYSTEMS

(71) Applicants: Dow Global Technologies LLC, Midland, MI (US); Rohm and Haas Company, Collegeville, PA (US)

(72) Inventors: Joseph J. Zupancic, Glen Ellyn, IL (US); Jorge Jimenez, Lake Jackson, TX (US); Amira A. Marine, Missouri City, TX (US); David E. Vietti, Cary, IL (US); Qiuyun Xu, Pearland, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/740,993

(22) PCT Filed: May 31, 2016

(86) PCT No.: PCT/US2016/035011
§ 371 (c)(1),
(2) Date: Dec. 29, 2017

(87) PCT Pub. No.: WO2017/003620
PCT Pub. Date: Jan. 5, 2017

(65) Prior Publication Data
US 2018/0186919 A1    Jul. 5, 2018

Related U.S. Application Data

(60) Provisional application No. 62/187,974, filed on Jul. 2, 2015.

(51) Int. Cl.
| | | |
|---|---|---|
| C08G 18/44 | (2006.01) | |
| B32B 7/12 | (2006.01) | |
| C08G 18/79 | (2006.01) | |
| C08G 63/64 | (2006.01) | |
| C09J 175/06 | (2006.01) | |
| B32B 15/20 | (2006.01) | |
| B32B 27/08 | (2006.01) | |
| C08G 18/42 | (2006.01) | |
| B32B 27/06 | (2006.01) | |
| B32B 27/16 | (2006.01) | |
| B32B 15/08 | (2006.01) | |
| B32B 15/088 | (2006.01) | |
| B32B 15/09 | (2006.01) | |
| B32B 27/32 | (2006.01) | |
| B32B 27/34 | (2006.01) | |
| B32B 27/36 | (2006.01) | |

(52) U.S. Cl.
CPC ............... *C08G 18/44* (2013.01); *B32B 7/12* (2013.01); *B32B 15/08* (2013.01); *B32B 15/088* (2013.01); *B32B 15/09* (2013.01); *B32B 15/20* (2013.01); *B32B 27/06* (2013.01); *B32B 27/08* (2013.01); *B32B 27/16* (2013.01); *B32B 27/32* (2013.01); *B32B 27/34* (2013.01); *B32B 27/36* (2013.01); *C08G 18/425* (2013.01); *C08G 18/4216* (2013.01); *C08G 18/4219* (2013.01); *C08G 18/4238* (2013.01); *C08G 18/792* (2013.01); *C08G 63/64* (2013.01); *C09J 175/06* (2013.01); *B32B 2250/02* (2013.01); *B32B 2250/24* (2013.01); *B32B 2255/10* (2013.01); *B32B 2255/26* (2013.01); *B32B 2307/54* (2013.01); *B32B 2323/046* (2013.01); *B32B 2323/10* (2013.01); *B32B 2367/00* (2013.01); *B32B 2377/00* (2013.01); *B32B 2439/70* (2013.01)

(58) Field of Classification Search
USPC .......... 528/73, 190, 192, 193, 194, 196, 198
See application file for complete search history.

(56) References Cited

U.S. PATENT DOCUMENTS

| | | |
|---|---|---|
| 4,137,221 A | 1/1979 | Hara et al. |
| 4,267,120 A | 5/1981 | Cuscurida et al. |
| 4,468,483 A | 8/1984 | Yeakey et al. |
| 6,348,121 B1 | 2/2002 | Schoener et al. |
| 7,553,914 B2 | 6/2009 | Chen et al. |
| 8,389,647 B2 | 3/2013 | Paschkowski |
| 2008/0009141 A1 | 1/2008 | Dubois et al. |
| 2010/0136347 A1 | 6/2010 | Simons et al. |
| 2011/0014479 A1 | 1/2011 | Song et al. |
| 2011/0293844 A1 | 12/2011 | Kasai et al. |
| 2013/0023625 A1 | 1/2013 | Montgomery et al. |
| 2014/0106173 A1 | 4/2014 | Booth et al. |

FOREIGN PATENT DOCUMENTS

| | | |
|---|---|---|
| EP | 600417 A1 | 6/1994 |
| EP | 2218759 A1 | 8/2010 |
| JP | 4342785 B2 | 10/2009 |
| JP | 2010280814 A | 12/2010 |
| JP | 2010285458 A | 12/2010 |
| JP | 2010285459 A | 12/2010 |
| JP | 2013107239 A | 6/2013 |
| JP | 2013216841 A | 10/2013 |

(Continued)

OTHER PUBLICATIONS

PCT/US2016/035011, International Search Report and Written Opinion of the International Searching Authority.

(Continued)

*Primary Examiner* — Terressa Boykin

(57) ABSTRACT

The instant invention provides a curable formulation suitable for laminating adhesive applications, and laminating adhesives made therefrom.

10 Claims, No Drawings

(56) References Cited

FOREIGN PATENT DOCUMENTS

| | | |
|---|---|---|
| JP | 5376162 B2 | 12/2013 |
| JP | 2014116295 A | 6/2014 |
| WO | 2008052134 A1 | 5/2008 |
| WO | 2013087449 A1 | 6/2013 |
| WO | 2013119496 A1 | 8/2013 |
| WO | 2014069563 A1 | 5/2014 |

OTHER PUBLICATIONS

PCT/US2016/035011, International Preliminary Report on Patentability.

LAMINATING ADHESIVE—POLYESTER-POLYCARBONATE-POLYOL SYSTEMS

REFERENCE TO RELATED APPLICATIONS

The present application claims the benefit of U.S. Provisional Application No. 62/187,974, filed on Jul. 2, 2015.

FIELD OF INVENTION

The instant invention relates to a curable formulation suitable for laminating adhesive applications, and laminating adhesives made therefrom.

BACKGROUND OF THE INVENTION

Two-part solventless or solvent-based laminating adhesives are useful in food packaging applications. These are typically polyester-polyol (hydroxyl terminated polyester) and/or polyether-polyol resins cured with aliphatic and/or aromatic isocyanate terminated resins. The critical criteria for these laminating adhesives are application viscosity at moderate application temperatures (ca. 20 to 70° C.), stable pot-life (application viscosity during processing), the rate of cure and overall bond strength characteristics for thin film flexible laminate structures. Utilization of aliphatic isocyanate terminated resins when employed in such laminating adhesive formulations and applications can have extremely long curing times. It is preferred to minimize the utilization of metal and/or amine based catalysts which can decrease pot-life stability and impose limitations for the use of flexible laminates in food packaging applications. The laminating adhesive should also be free of Bisphenol-A based components which may restrict the utility of application and use in food packaging applications. Therefore, a laminating adhesive having the above properties while still being suitable for use in food packaging applications would be desirable.

SUMMARY OF THE INVENTION

The instant invention provides a curable formulation comprising, consisting of, or consisting essentially of a polyester-polycarbonate having a polycarbonate functionality in the range of from 10-25%, a hydroxyl number in the range of from 100-250 and a number average molecular weight (Mn) in the range of from 450 to 1200.

In another alternative embodiment, the instant invention further provides a laminating adhesive comprising the inventive curable formulation.

DETAILED DESCRIPTION OF THE INVENTION

The instant invention provides a curable formulation suitable for laminating adhesive applications, and laminating adhesives made therefrom. The curable formulation suitable for laminating adhesives comprises, consists of, or consists essentially of a polyester-polycarbonate having a polycarbonate functionality in the range of from 10-25%, a hydroxyl number in the range of from 100-250 and a number average molecular weight (Mn) in the range of from 450 to 1200.

The polyester-polycarbonate polyol generally has a polycarbonate functionality in the range of from 10% to 25%. All individual values and subranges between 10 and 25% are included herein and disclosed herein; for example, the polyester-polycarbonate polyol can have a polycarbonate functionality in the range of from 12% to 23%, or from 15% to 20%.

The polyester-polycarbonate polyol generally has a hydroxyl number in the range of from 100-250. All individual values and subranges between 100 and 250 are included herein and disclosed herein; for example, the polyester-polycarbonate polyol can have a hydroxyl number in the range of from 150 to 225 or 160-210.

The polyester-polycarbonate polyol generally has a number average molecular weight (Mn) in the range of from 450 to 1200. All individual values and subranges between 450 and 1200 are included herein and disclosed herein; for example, the polyester-polycarbonate polyol can have a molecular weight in the range of from 500 to 800 or 530 to 730.

The polyester-polycarbonate polyol is derived from a polyester precursor selected from the group consisting of polyester resins based upon ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, isosorbide, trimethylol ethane, trimethylol propane, glycerine, fumaric acid, maleic acid, adipic acid, succinic acid, azelaic acid, sebacic acid, phthalic anhydride, isophthalic acid, terephthalic acid, 1,4-cyclohexanedicarboxylic acid, maleic anhydride, succinic anhydride and combinations thereof.

The polyester-polycarbonate polyol is also derived from a polyaliphatic carbonate precursor based upon ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, and isosorbide and combinations thereof.

The polyester and polycarbonate resins can be prepared employing a low level of a catalyst (10.0 to 150.0 ppm) such as hydroxybutyltin oxide (FASCAT 9100), stannous octoate, monobutyltin tris (2-ethylhexanoate), Tyzor TPT (Tetra-isopropyl Titanate), Tyzor TNBT (Tetra-n-Butyl Titanate), etc. In addition, these catalysts can be optionally employed at similar concentration levels if needed for the transesterification reaction of the polyester resin with the polycarbonate resin to produce the polyester-polycarbonate-polyol resin.

The polyester-polycarbonate polyol can also optionally be derived from a glycol precursor selected from the group consisting of ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, isosorbide, and combinations thereof.

The polyester-polycarbonate polyol has generic Structure I with the following specifications:

Structure I

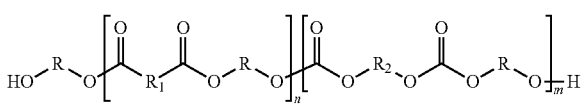

R is the glycol component of the polyester precursor or the optional glycol precursor, $R_1$ is the dicarboxylic acid of the polyester precursor, $R_2$ is the glycol component of the polycarbonate precursor, n is from 0 to 10, m is from 0 to 10, and m+n is from 1 to 10.

Examples of R include, but are not limited to —$(CH_2)_2$—, —$(CH_2)_2$—O—$(CH_2)_2$—, —$(CH_2)_2$—O—$(CH_2)_2$—O—$(CH_2)_2$—, —$(CH_2)_2$—O—$(CH_2)_2$—O—$(CH_2)_2$—O$(CH_2)_2$—, —$CH_2$—$CH(CH_3)$—, —$CH_2$—$CH(CH_3)$—O—$CH_2$—$CH(CH_3)$—, —$(CH_2)_4$—, —$CH_2$—$CH(CH_3)$—$CH_2$—, —$CH_2$—$C(CH_3)_2$—$CH_2$—, —$(CH_2)_6$—, $CH_3C(CH_2)_3$—, $CH_3CH_2C(CH_2)_3$—, (—$CH_2)_2CH$—,

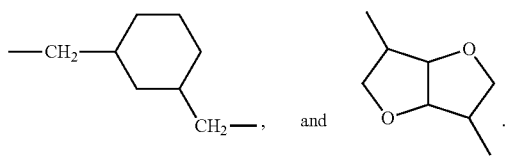

Examples of $R_1$ include, but are not limited to —$(CH_2)_2$—, —$(CH_2)_4$—, cis- or trans- —CH=CH—, —$(CH_2)_7$—, —$(CH_2)_8$—,

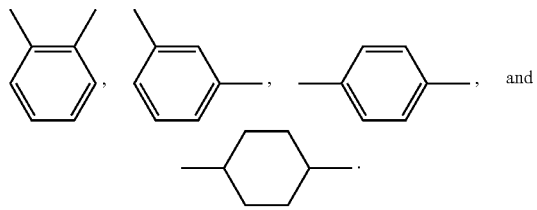

Examples of $R_2$ include, but are not limited to —$(CH_2)_2$—, —$(CH_2)_2$—O—$(CH_2)_2$—, —$(CH_2)_2$—O—$(CH_2)_2$—O—$(CH_2)_2$—, —$(CH_2)_2$—O—$(CH_2)_2$—O—$(CH_2)_2$—O—$(CH_2)_2$—O$(CH_2)_2$—, —$CH_2$—$CH(CH_3)$—, —$CH_2$—$CH(CH_3)$—O—$CH_2$—$CH(CH_3)$—, —$(CH_2)_4$—, —$CH_2$—$CH(CH_3)$—$CH_2$—, —$CH_2$—$C(CH_3)_2$—$CH_2$—, —$(CH_2)_6$—,

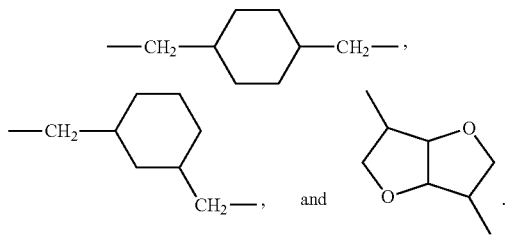

The mole fraction of —OH (hydroxyl) radical in the polyester-polycarbonate polyol is typically in the range of from 0.0303 to 0.1043. Any and all values between 0.0303 to 0.1043 are included herein and disclosed herein, for example, the —OH mole fraction can be from 0.0454 to 0.1022 or 0.0485 to 0.0955.

The mole fraction of

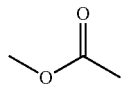

(ester) radical in the polyester-polycarbonate polyol is typically in the range of from 0.0718 to 0.2260. Any and all values between 0.0718 and 0.2260 are included herein and disclosed herein, for example, the mole fraction of the ester radical can be from 0.0723 to 0.2212 or from 0.0740 to 0.2202.

The mole fraction of

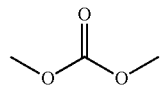

(carbonate) radical in the polyester-polycarbonate polyol is typically in the range of from 0.0107 to 0.0856. Any and all values between 0.0107 and 0.0856 are included herein and disclosed herein, for example, the mole fraction of the carbonate radical can be from 0.0301 to 0.0838 or from 0.0299 to 0.0834.

The ratio the mole fraction of the carbonate radical to the mole fraction of the ester radical is typically in the range of from 0.047 to 1.192. Any and all values between 0.047 and 1.192 are included herein and disclosed herein, for example, the ratio can be from 0.136 to 1.159 or from 0.0135 to 1.159.

The ratio of the hydroxyl mole fraction to the sum of the ester and carbonate mole fractions is typically in the range of from 0.097 to 1.264. Any and all values between 0.097 and 1.264 are included herein and disclosed herein, for example, the ratio can be from 0.148 to 0.998 or from 0.159 to 0.919.

The polyester-polycarbonate-polyols can be cured (cross-linked) with an aromatic and/or aliphatic isocyanate terminated prepolymer to yield a polyester-polycarbonate-urethane polymer network. In various embodiments, the aromatic isocyanate terminated prepolymers can be based upon Methylene Diphenyl Diisocyanate (MDI), Toluene Diisocyanate (TDI) chain extended with polyglycols and/or polyester resins. Aliphatic isocyanate terminated prepolymers can be based upon Isophorone Diisocyanate (IPDI), Hexamethylene Diisocyanate (HDI), Xylylene Diisocyanate (XDI) homo-polymerized or chain extended with polyether-polyol and/or polyester resins. Homo-polymers and oligomers of Hexamethylene Diisocyanate are of particular interest such as Desmodur N3200, Desmodur N3300, Desmodur N3400, Desmodur N3600, Desmodur N3800, Desmodur N3900, Basonat HI 100, and mixtures thereof.

The mix ratio for the polyester-polycarbonate-polyol and the isocyanate terminated prepolymer is based upon equivalent weight of the isocyanate and the equivalent weight of the polyester-polycarbonate-polyol. The equivalent weight of the isocyanate terminated prepolymer is calculated from the % NCO for that component by the following equation:

Equivalent Weight of Isocyanate=(42*100)/% NCO

The equivalent weight of the polyester-polycarbonate-polyol is calculated from the hydroxyl number (OHN) for that component by the following equation:

Hydroxyl Equivalent Weight of polyester-polycarbonate-polyol=56100/OHN

The equivalents of each component is calculated from the weight of that component present in the mixture divided by that component's equivalent weight.

Preferably the mix ratio, on an equivalent basis, of isocyanate to polyester-polycarbonate-polyol is in the range of 2:1 to 1:1. Any and all values between 2:1 and 1:1 are included herein and disclosed herein, for example, the mix ratio can be 1.7:1 to 1.25:1 or 1.6:1 to 1.35:1.

The curing conditions employed will de dependent upon the type of isocyanate terminated prepolymer being used. Adhesive systems based upon aliphatic isocyanate terminated prepolymers for the system of the current invention are capable of curing at 25 to 50° C. for systems cured and show bond strength development within 24 hours and complete cure in ≤7 days. Adhesive systems based upon aromatic isocyanate terminated prepolymers will cure at 25 to 30° C. with bond strength development within 24 hours and complete cure in ≤7 days.

In various embodiments, the formulation can also comprise a solvent. Examples of solvents that can be used include, but are not limited to ethyl acetate, methyl ethyl ketone, methyl acetate, acetone, and combinations thereof. A solvent borne adhesive will have application solids in the range of 25 to 95% solids, 35 to 80% solids in various other embodiments and 40 to 60% solids in various other embodiments. The application viscosity of adhesive will be in the range of 20 to 50 mPa*s, and preferably in the range of 25 to 40 mPa*s. The pot-life stability for the solvent borne systems is defined by the consistency of the viscosity of the fully formulated adhesive (polyester-polycarbonate polyol with isocyanate terminated prepolymer) at the same % solids, the viscosity should remain unchanged or show less than 10% increase in viscosity over a 8 to 12 hour period of time, in some embodiments, less than 5% increase in viscosity over 8 to 12 hours. The application temperature of adhesive will generally be ca. 20 to 35° C., and 25 to 30° C. in various other embodiments, but due to unconditioned temperature environments in a plant the temperature may be outside the desired range. For solvent borne adhesive systems the coating weight range of the adhesive will generally be in the range of 1.50 to 5.70 g/m² (0.92 to 3.50 lbs/rm) and in the range of 1.50 to 4.50 g/m² (0.92 to 2.76 lbs/rm) in various other embodiments.

The formulation can also be solvent-free. A solventless adhesive will generally have a solids content in the range of 95 to 100%, 99 to 100% solids in various other embodiments, and more preferably 100% solids in various other embodiments. The application temperature of adhesive will be in the range of ca. 20 to 70° C., and in the range of 40 to 60° C. in various other embodiments. The application viscosity of adhesive (at the application temperature) will be in the range of ≤1000 to 5000 mPa*s, and in the range of 1000 to 4000 mPa*s in various other embodiments. The pot-life stability is defined as consistency of the viscosity of the fully formulated adhesive (polyester-polycarbonate polyol with isocyanate terminated prepolymer) at the application temperature. The viscosity of the adhesive should not increase more than twice (2×) its initial viscosity over period of time of 15 to 60 minutes, and more preferably over a time period of 20 to 40 minutes. For solventless adhesive systems, the coating weight range of the adhesive will be in the range of 1.22 to 2.44 g/m² (0.75 to 1.50 lbs/rm) and in the range of 1.30 to 1.95 g/m² (0.80 to 1.20 lbs/rm) in various other embodiments.

In various embodiments, the instant invention provides a laminating adhesive characterized by having the following properties for a solventless or solvent borne adhesive. Generally the laminating adhesive will have a minimum adhesive bond strength in the range of from 1.5 to 5.0 N/15 mm and an application viscosity of ≤6500 mPa*s at 50° C.

Specific property requirements for a solventless adhesive system are: application temperature of ca. 20 to 70° C., application viscosity (at application temperature) of ≤1000 to 5000 mPa*s, pot-life stability of 20 to 60 minutes at application temperature, capable of curing at temperatures of 25 to 50° C. for systems cured with aliphatic isocyanate terminated prepolymers, and at 25 to 30° C. for systems cured with aromatic isocyanate terminated prepolymers, coating weight of 1.22 to 2.44 g/m² (0.75 to 1.50 lbs/ream), and bond strength development within 24 hours and complete cure in ≤7 days.

Specific property requirements for a solvent based adhesive system are: application temperature of ca. 20 to 35° C., application viscosity (at application temperature) of ≤20 to 50 mPa*s, pot life stability of 8 to 12 hours at application temperature, capable of curing at 25 to 50° C. for systems cured with aliphatic isocyanate terminated prepolymers and at 25 to 30° C. for systems cured with aromatic isocyanate terminated prepolymers, coating weight of 1.50 to 5.70 g/m² (0.92 to 3.50 lbs/ream), and bond strength development within 24 hours and complete cure in ≤7 days.

The curable formulation according to the present invention can be formed into laminating adhesives and can be used in various packaging applications, e.g. food packaging applications, such as general sealed bags or pouches for condiments, cooking ingredients and flavorings, dry food (potato chips, pretzels, nuts, snack treats, etc.), pouches or boxes for beverages, soup in boxes, packaged cheese(s), packaged meat(s), frozen foods and vegetables, precooked foods, hot fill pouches or trays, boil-in-bag foods, microwave packaged goods for reheating or baking, retort packaged foods, ready to eat meals, institutional foods in packages, etc., but not limited to these specific examples.

The laminating adhesives can be used in the construction of laminates based upon polyethylene film, polypropylene film, co-polymerized olefin films, coextruded films, nylon film, polyester film, metallized film, aluminum foil, ceramic coated film, organic barrier coated film, etc. The films and substrates which can be utilized in the fabrication of laminates will have a thickness of 10 micrometers to 1 mm. The laminate can be a simple two ply construction or more complex structures of three, four ply or multi-ply construction depending upon the desired packaging requirements for the application. The thickness of the adhesive coating can be in the range of ca. 1.0 to 4.5 micrometers depending upon the coating weight of the adhesive and the density of adhesive.

EXAMPLES

Example 1: Polyester Resin

A polyester resin is prepared based upon the following composition:

| Item | Monomer/Intermediate | Charge (g) |
| --- | --- | --- |
| 1 | Diethylene Glycol | 1810.68 |
| 2 | Adipic Acid | 1578.45 |
| 3 | Fascat 9100 | 0.09 |

The resin had the final physical properties: AV 0.5, OHN 224, Viscosity at 25° C. of 500 mPa*s, SEC analysis Mn 1000, Mw 1550, Polydispersity 1.55.

Example 2: Polyester Resin

A polyester resin is prepared based upon the following composition:

| Item | Monomer/Intermediate | Charge (g) |
|---|---|---|
| 1 | Diethylene glycol | 1488.69 |
| 2 | Adipic Acid | 1129.77 |
| 3 | Isophthalic Acid | 613.05 |
| 4 | Trimethylolpropane | 122.55 |
| 5 | Fascat 9100 | 0.06 |

The resin had the final physical properties: AV 0.4, OHN 183, Viscosity at 25° C. of 6000.0 mPa*s, SEC analysis Mn 1250, Mw 2500, Polydispersity 2.0.

Example 3: Polyester Resin

A polyester resin was prepared based upon the following composition:

| Item | Monomer/Intermediate | Charge (g) |
|---|---|---|
| 1 | 2-Methyl-1,3-propanediol (MP Diol) | 1643.28 |
| 2 | Adipic Acid | 1797.81 |
| 3 | Isophthalic Acid | 3.57 |
| 4 | Terephthalic Acid | 3.57 |
| 5 | Tyzor TPT (Tetra-isopropyl Titanate) | 0.06 |

The resin had the final physical properties: AV 0.3, OHN 231, Viscosity at 25° C. of 950.0 mPa*s, SEC analysis Mn 950, Mw 1550, Polydispersity 1.6.

Example 4: Polyester Resin

A polyester resin was prepared based upon the following composition:

| Item | Monomer/Intermediate | Charge (g) |
|---|---|---|
| 1 | Diethylene Glycol | 1125.46 |
| 2 | Adipic Acid | 1015.62 |
| 3 | Isophthalic Acid | 172.42 |
| 4 | Tyzor TNBT (Tetra-n-Butyl Titanate) | 0.08 |

The resin had the final physical properties: AV 0.10, OHN 136.0, Viscosity at 25° C. of 1900.0 mPa*s, SEC analysis Mn 1300, Mw 2350, Polydispersity 1.80.

Example 5: Polyester Resin

A polyester resin was prepared based upon the following composition:

| Item | Monomer/Intermediate | Charge (g) |
|---|---|---|
| 1 | Neopentyl Glycol | 568.80 |
| 2 | 1,6-Hexanediol | 580.80 |
| 3 | Adipic Acid | 1150.40 |
| 4 | Tyzor TNBT (Tetra-n-Butyl Titanate) | 0.14 |

The resin had the final physical properties: AV 0.60, OHN 118.0, Viscosity at 25° C. of 3050.0 mPa*s, SEC analysis Mn 1650, Mw 2850, Polydispersity 1.70.

Example 6: Polyester Resin

A polyester resin was prepared based upon the following composition:

| Item | Monomer/Intermediate | Charge (g) |
|---|---|---|
| 1 | Neopentyl Glycol | 491.20 |
| 2 | 1,6-Hexanediol | 663.20 |
| 3 | Adipic Acid | 1133.60 |
| 4 | Stannous Octoate | 0.104 |

The resin had the final physical properties: AV 0.10, OHN 135.0, Viscosity at 25° C. of 850.0 mPa*s, SEC analysis Mn 1400, Mw 2450, Polydispersity 1.75.

Example 7: Preparation of 1,4-Butanediol-Carbonate Resin

A polycarbonate resin was prepared based upon the following composition:

| Item | Monomer/Intermediate | Charge (g) |
|---|---|---|
| 1 | 1,4-Butanediol | 67958.0 |
| 2 | Dimethyl Carbonate | 102864.0 |
| 3 | Tyzor TPT (Tetra-isopropyl Titanate) | 21.6 |

A 30 gal 316L stainless steel vessel having an internal diameter of 20 in was equipped with internal baffles, variable speed 12-in turbine impeller, sparge ring, closed loop system consisting of a mixed DOWTHERM* system with independent hot and cold loops and a 24-inch packed column. To the reactor 67958.0 g butanediol were added and heated to 150° C. while sweeping with $N_2$ to inert the reactor and remove water present in the butane diol. Tyzor TPT catalyst (21.6 g) was added and the line flushed with 600.0 g previously purged from the reactor. Dimethyl carbonate (DMC) was added from the weight pot using a flow meter and control valve over a period of 6-8 hrs, maintaining the temperature in the column at 65° C. Upon completion of the DMC addition, the temperature was increased to 195° C. and progress of the reaction tracked by OH number and 1H-NMR for end-group analysis. After 8 hrs at 195° C., the OH number was found to be 30.7 with 25% carbonate end-group by 1H-NMR. The temperature was decreased to 150° C. and to the reaction was added 4.1 lbs of BDO. The temperature was brought up to 195° C. and after 8 hrs the hydroxyl number was found to be 54 mgKOH/g with ≤1% carbonate end-groups.

The resin had the final physical properties: OHN 54, SEC analysis Mn 1960.

Example 8: Preparation of Polyester-Carbonate-Polyol Resin

A polyester-carbonate-polyol resin was prepared based upon the following composition:

| Item | Monomer/Intermediate | Charge (g) |
|---|---|---|
| 1 | Polyester Resin of Example 1 | 750.0 |
| 2 | 1,4-Butanediol-Carbonate Resin of Example 7 | 212.5 |
| 3 | 1,4-Butanediol | 37.5 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 233.0, Viscosity at 25° C. of 700 mPa*s, SEC analysis Mn 742, Mw 1054, Polydispersity 1.42.

Example 9: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 1 | 500.0 |
| 2 | 1,4-Butanediol-Carbonate Resin of Example 7 | 425.0 |
| 3 | 1,4-Butanediol | 75.0 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 241.8, Viscosity at 25° C. of 1000 mPa*s, SEC analysis Mn 723, Mw 1047, Polydispersity 1.45.

Example 10: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 2 | 750.0 |
| 2 | 1,4-Butanediol-Carbonate Resin of Example 7 | 222.5 |
| 3 | 1,4-Butanediol | 27.5 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 192.8, Viscosity at 25° C. of 4700 mPa*s, SEC analysis Mn 900, Mw 1480, Polydispersity 1.64.

Example 11: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 2 | 500.0 |
| 2 | 1,4-Butanediol-Carbonate Resin of Example 7 | 445.0 |
| 3 | 1,4-Butanediol | 55.0 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 194.6, Viscosity at 25° C. of 4450 mPa*s, SEC analysis Mn 894, Mw 1399, Polydispersity 1.57.

Example 12: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 3 | 750.0 |
| 2 | 1,4-Butanediol-Carbonate Resin of Example 7 | 214.5 |
| 3 | 1,4-Butanediol | 35.5 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 241.8, Viscosity at 25° C. of 1153 mPa*s, SEC analysis Mn 742, Mw 1061, Polydispersity 1.43.

Example 13: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 4 | 750.0 |
| 2 | 1,4-Butanediol-Carbonate Resin of Example 7 | 233.2 |
| 3 | 1,4-Butanediol | 16.8 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 143.3, Viscosity at 25° C. of 3057 mPa*s, SEC analysis Mn 1020, 1711 Mw 1711, Polydispersity 1.67.

Example 14: Preparation of Polyester-Carbonate-Polyol Resin

A polyester-carbonate-polyol resin was prepared based upon the following composition:

| Item | Monomer/Intermediate | Charge (g) |
| --- | --- | --- |
| 1 | Polyester Resin of Example 5 | 750.0 |
| 2 | 1,4-Butanediol-Carbonate Resin of Example 7 | 238.2 |
| 3 | 1,4-Butanediol | 11.2 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 120.0, Viscosity at 25° C. of 3727 mPa*s, SEC analysis Mn 1112, Mw 2066, Polydispersity 1.86.

Example 15: Preparation of Polyester-Carbonate-Polyol Resin

A polyester-carbonate-polyol resin was prepared based upon the following composition:

| Item | Monomer/Intermediate | Charge (g) |
|---|---|---|
| 1 | Polyester Resin of Example 6 | 750.0 |
| 2 | 1,4-Butanediol-Carbonate Resin of Example 7 | 236.6 |
| 3 | 1,4-Butanediol | 13.4 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 126.0, Viscosity at 25° C. of 3465 mPa*s, SEC analysis Mn 1105, Mw 2062, Polydispersity 1.87.

Example 16: Preparation of Polyester-Carbonate-Polyol Resin

A polyester-carbonate-polyol resin was prepared based upon the following composition:

| Item | Monomer/Intermediate | Charge (g) |
|---|---|---|
| 1 | Polyester Resin of Example 2 | 875.0 |
| 2 | 1,4-Butanediol-Carbonate Resin of Example 7 | 111.25 |
| 3 | 1,4-Butanediol | 13.75 |

The resin was prepared by charging Items 1 through 3 to a 3 L 3 neck flask equipped with Teflon stir blade. The mixture was heated to 210° C. and maintained at that temperature for 4 hr under a nitrogen purge.

The resin had the final physical properties: OHN 205.1, Viscosity at 25° C. of 4300 mPa*s, SEC analysis Mn 805, Mw 1522, Polydispersity 1.89.

Example 17: Preparation of Polyester Resin

| Item | Monomer/Intermediate | Charge (g) |
|---|---|---|
| 1 | Polyester Resin of Example 1 | 374.79 |
| 2 | Tyzor TPT (Tetra-isopropyl Titanate) | 0.0617 |

Items 1 and 2 were charged to a glass bottle and mixed at 25° C. for 2 hours until uniform in appearance.

The resin had the final physical properties: AV 0.60, OHN 234.0, Viscosity at 25° C. of 611.87 mPa*s, SEC analysis Mn 950, Mw 1550, Polydispersity 1.65.

Example 18: Preparation of Catalyst Solution

| Item | Monomer/Intermediate | Charge (g) |
|---|---|---|
| 1 | Diethylene glycol | 50.02 |
| 2 | Tyzor TPT (Tetra-isopropyl Titanate) | 0.5125 |

Items 1 and 2 were charged to a glass bottle and were mixed at 25° C. for 2 hours until uniform in appearance.

Example 19: Preparation of Catalyst Solution

| Item | Monomer/Intermediate | Charge (g) |
|---|---|---|
| 1 | 1,4-Butanediol | 50.01 |
| 2 | Tyzor TPT (Tetra-isopropyl Titanate) | 0.5899 |

Items 1 and 2 were charged to a glass bottle and were mixed at 25° C. for 2 hours until uniform in appearance.

Example 20: Preparation of Polyester Resin

| Item | Monomer/Intermediate | Charge (g) |
|---|---|---|
| 1 | Polyester Resin of Example 2 | 318.91 |
| 2 | Catalyst solution of Example 18 | 4.79 |

Items 1 and 2 were charged to a glass bottle and were mix at 25° C. for 2 hours until uniform in appearance.

The resin had the final physical properties: AV 0.60, OHN 196.0, Viscosity at 25° C. of 6331.00 mPa*s, SEC analysis Mn 1250, Mw 2600, Polydispersity 2.10.

Example 21: Preparation of Polyester Resin

| Item | Monomer/Intermediate | Charge (g) |
|---|---|---|
| 1 | Polyester Resin of Example 2 | 310.05 |
| 2 | Catalyst solution of Example 19 | 4.12 |

Items 1 and 2 were charged to glass bottle and were mixed at 25° C. for 2 hours until uniform in appearance.

The resin had the final physical properties: AV 0.70, OHN 199.0, Viscosity at 25° C. of 6584.00 mPa*s, SEC analysis Mn 1400, Mw 2600, Polydispersity 1.85.

Example 22: Preparation of Polyester/Polyester-Carbonate-Polyol Resin Blend

| Item | Monomer/Intermediate | Charge (g) |
|---|---|---|
| 1 | Polyester Resin of Example 2 | 327.43 |
| 2 | Polyester-Polycarbonate-Polyol Resin of Example 10 | 37.16 |

Items 1 and 2 were charged to a glass bottle and were mixed at 25° C. for 2 hours until uniform in appearance.

The resin had the final physical properties: AV 0.69, OHN 185.6, Viscosity at 25° C. of 8199.67 mPa*s, SEC analysis Mn 1350, Mw 2650, Polydispersity 1.95.

Example 23: Preparation of Polyester/Polyester-Carbonate-Polyol Resin Blend

| Item | Monomer/Intermediate | Charge (g) |
|---|---|---|
| 1 | Polyester Resin of Example 2 | 245.64 |
| 2 | Polyester-Polycarbonate-Polyol Resin of Example 10 | 82.26 |

Items 1 and 2 were charged to a glass bottle and were mixed at 25° C. for 2 hours until uniform in appearance.

The resin had the final physical properties: AV 0.68, OHN 184.66, Viscosity at 25° C. of 7837.00 mPa*s, SEC analysis Mn 1250, Mw 2550, Polydispersity 2.00.

The adhesion properties of the polyester-carbonate-polyols and polyester were evaluated with an aliphatic isocyanate resin (Desmodur N3300) having the following properties 100.0% solids, % NCO 21.70±0.40%, viscosity 2900±1100 mPa*s using a series of laminate constructions. These two part adhesive systems were evaluated via a solvent hand casting method and laminator.

Adhesive Lamination Evaluation Procedure:

Adhesive formulas were screened from a solvent based solution (50% solids) by dissolving the Desmodur N3300 in dry ethyl acetate and mixing on a rolling mill in a glass bottle, then adding the polyester or polyester-polycarbonate-polyol to the solution and mixing further on the rolling mill until the solution is uniform in appearance.

The films and metallized films were corona treated at a power level of ca. 0.1 KW. Aluminum Foil was used without corona treatment. The adhesive solution was hand coated onto the primary film with a #3 wire wound draw down rod to yield a coating weight of 1 lbs/rm (1.6276 g/m$^2$) and then dried under an IR heater for approximately 30 seconds. The primary film was laminated to the secondary film on a water heated laminator with a nip temperature of 65.5° C. (150° F.). Three laminates 20.3 cm×27.9 cm (8 in.×11 in.) were prepared for each construction with a bond strip within the laminate to facilitate bond testing. The laminates were placed under a 0.45-0.90 Kg (1-2 lbs) weight in order to apply equivalent pressure across the laminate sample.

The following abbreviations are used to describe test results: as: adhesive split; ftr: film tear; fstr: film stretch; at: adhesive transfer; sec: secondary; zip: zippery bond; pmt: partial metal transfer. Adhesion bond strengths were determined on a 15 mm wide strip of laminate on a Thwing-Albert Tensile Tester (Model QC-3A) with a 50 Newton load cell at a 10.0 cm/min rate.

The substrates used in fabrication of test laminates are summarized in the following table:

| Film | Description |
| --- | --- |
| 75 SLP | Exxon Mobil Bicor SLP Oriented Polypropylene, Non-Heat Sealable, Thickness 19 micrometers (0.750 mils |
| 70 SPW | Exxon Mobil Bicor SPW Coextruded Polypropylene, Thickness 18 micrometers |
| PE (GF19) | Berry Plastics Corp., High slip LDPE film, 1.0 mil (25.4 microns) |
| PET (92LBT) | DuPont, Polyester, Poly(ethylene glycol - terephthalate), Thickness 12 microns |
| Emblem 1500 (Nylon) | Honeywell Capran Emblem 1500, Biaxially Oriented Nylon 6, Thickness 15 microns |
| PET-Met | FILMTech Inc., Metallized Polyester Film, Thickness 25.4 microns |
| OPP-Met | AET Films, Metallized Oriented Polypropylene Film, MT Film, Heat Sealable, Thickness 18 microns |
| Foil (Backed Foil) | PET Backed Foil - 48 Gauge PET film (12 micron thick), 0.00035" Al Foil |
| 3 mil CPP | 3 mil Cast Polypropylene Film |

The laminate constructions evaluated are summarized in the following table:

| Code | Primary Substrate | Secondary Substrate |
| --- | --- | --- |
| CoexPP (75SLP)/CoexPP (70SPW) | 75SLP (SLP Oriented Polypropylene) | 70SPW (Bicor SPW Coextruded Film) |
| CoexPP (75SLP)/PE (GF-19) | 75SLP (SLP Oriented Polypropylene) | GF-19 (High Slip Polyethylene) |
| PET (92LBT)/PE (GF-19) | 92LBT (PET Polyester Film) | GF-19 (High Slip Polyethylene) |
| Nylon/PE (GF-19) | Emblem 1500 (Biaxially Oriented Nylon 6 Film) | GF-19 (High Slip Polyethylene) |
| PET-Met/PE (GF-19) | PET-Met (Metallized Polyester) | GF-19 (High Slip Polyethylene) |
| OPP-Met/PE (GF-19) | OPP-Met (Metallized Oriented Polypropylene) | GF-19 (High Slip Polyethylene) |
| OPP-Met/CoexPP (70SPW) | OPP-Met (Metallized Oriented Polypropylene) | GF-19 (High Slip Polyethylene) |
| Backed Foil/Nylon | Backed Foil | Nylon (Biaxially Oriented Nylon 6 Film) |
| Backed Foil/PET (92LBT) | Backed Foil | 92LBT (PET Polyester Film) |
| Backed Foil/3 mil CPP | Backed Foil | 3 mil Cast Polypropylene Film |
| PET (92LBT)/3 mil CPP | 92LBT (PET Polyester Film) | 3 mil Cast Polypropylene Film |
| Nylon/3 mil CPP | Emblem 1500 (Biaxially Oriented Nylon 6 Film) | 3 mil Cast Polypropylene Film |

Comparative Example 24

Polyester Resin of Example 1 was evaluated with at a mix ratio of Desmodur N3300: Polyester Resin of 100:86.8 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
| --- | --- | --- | --- |
| | 1 Day | 7 Days | 14 Days |
| CoexPP (75SLP)/CoexPP (70SPW) | 0.00, as | 1.45, ftr | 1.85, ftr |
| CoexPP (75SLP)/PE (GF-19) | 0.00, as | 6.54, ftr | 6.23, ftr |
| PET (92LBT)/PE (GF-19) | 0.00, as | 4.67, ftr | 3.27, ftr |
| Nylon/PE (GF-19) | 0.00, as | 4.14, ftr | 5.37, ftr |
| PET-Met/PE (GF-19) | 0.00, as | 6.23, ftr | 2.46, ftr |
| OPP-Met/PE (GF-19) | 0.00, as | 5.16, ftr | 4.19, ftr |
| OPP-Met/CoexPP (70SPW) | 0.00, as | 2.61, ftr | 3.07, ftr |
| Backed Foil/Nylon | 0.00, as | 0.58, at, sec | 1.30, at, sec |
| Backed Foil/PET (92LBT) | 0.00, as | 0.71, at, sec | 2.00, at, sec |
| Backed Foil/3 mil CPP | 0.00, as | 2.14, at, sec | 3.29, at, sec |
| PET (92LBT)/3 mil CPP | 0.00, as | 1.90, ftr | 1.90, ftr |
| Nylon/3 mil CPP | 0.00, as | 8.74, ftr | 8.74, ftr |

The pot-life viscosity for the neat adhesive (no solvent) system was determined at 40° C.: Initial viscosity: 850.0 mPa*s, Viscosity at 10 mins.: 787.5 mPa*s, Viscosity at 15 mins.: 775.0 mPa*s, Viscosity at 20 mins: 775.0 mPa*s, Viscosity at 30 mins.: 750.0 mPa*s, Viscosity at 40 mins: 725.0 mPa*s, Viscosity at 60 mins.: 737.5 mPa*s.

Comparative Example 25

Polyester Resin of Example 1 was evaluated with at a mix ratio of Desmodur N3300: Polyester Resin of 100:82.2 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 0.00, as | 1.13, ftr | 1.40, ftr |
| CoexPP (75SLP)/PE (GF-19) | 0.00, as | 5.21, ftr | 4.30, ftr |
| PET (92LBT)/PE (GF-19) | 0.00, as | 5.79, ftr | 2.61, ftr |
| Nylon/PE (GF-19) | 0.00, as | 3.81, ftr | 4.74, ftr |
| PET-Met/PE (GF-19) | 0.00, as | 5.60, ftr | 3.01, ftr |
| OPP-Met/PE (GF-19) | 0.00, as | 4.08, ftr | 3.62, ftr |
| OPP-Met/CoexPP (70SPW) | 0.00, as | 2.10, ftr | 2.51, ftr |
| Backed Foil/Nylon | 0.00, as | 0.88, at, sec | 1.74, at, sec |
| Backed Foil/PET (92LBT) | 0.00, as | 0.47, at, sec | 1.39, at, sec |
| Backed Foil/3 mil CPP | 0.00, as | 2.19, at, sec | 3.08, at, sec |
| PET (92LBT)/3 mil CPP | 0.00, as | 1.97, ftr | 1.78, ftr |
| Nylon/3 mil CPP | 0.00, as | 5.15, ftr | 6.21, ftr |

The pot-life viscosity for the neat adhesive (no solvent) system was determined at 40° C.: Initial viscosity: 912.5 mPa*s, Viscosity at 10 mins.: 850.0 mPa*s, Viscosity at 15 mins.: 825.0 mPa*s, Viscosity at 20 mins: 800.0 mPa*s, Viscosity at 30 mins.: 800.0 mPa*s, Viscosity at 40 mins: 800.0 mPa*s, Viscosity at 60 mins.: 787.5 mPa*s.

Comparative Example 26

Polyester Resin of Example 2 was evaluated with at a mix ratio of Desmodur N3300: Polyester Resin of 100:109.6 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 0.00, as | 1.17, ftr | 1.25, ftr |
| CoexPP (75SLP)/PE (GF-19) | 0.00, as | 5.81, ftr | 6.32, ftr |
| PET (92LBT)/PE (GF-19) | 0.00, as | 3.97, ftr | 4.45. ftr |
| Nylon/PE (GF-19) | 0.00, as | 3.85, ftr | 4.19. ftr |
| PET-Met/PE (GF-19) | 0.00, as | 5.63, ftr | 5.97, ftr |
| OPP-Met/PE (GF-19) | 0.00, as | 2.26, ftr | 2.68, ftr |
| OPP-Met/CoexPP (70SPW) | 0.00, as | 1.75, ftr | 2.14, ftr |
| Backed Foil/Nylon | 0.00, as | 0.84, at, sec | 1.04, at, sec |
| Backed Foil/PET (92LBT) | 0.00, as | 0.57, at, sec | 0.85, at, sec |
| Backed Foil/3 mil CPP | 0.00, as | 1.88, at, sec | 2.11, at, sec |
| PET (92LBT)/3 mil CPP | 0.00, as | 2.17, ftr | 2.61, ftr |
| Nylon/3 mil CPP | 0.00, as | 4.55, ftr | 4.15, ftr |

The pot-life viscosity for the neat adhesive (no solvent) system was determined at 40° C.: Initial viscosity: 2125.0 mPa*s, Viscosity at 10 mins.: 2025.0 mPa*s, Viscosity at 15 mins.: 1937.5 mPa*s, Viscosity at 20 mins: 1900.0 mPa*s, Viscosity at 30 mins.: 1887.5 mPa*s, Viscosity at 40 mins: 1887.5 mPa*s, Viscosity at 60 mins.: 1875.0 mPa*s.

Comparative Example 27

Polyester Resin of Example 2 was evaluated with at a mix ratio of Desmodur N3300: Polyester Resin of 100:103.8 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 0.00, as | 0.94, ftr | 0.99, ftr |
| CoexPP (75SLP)/PE (GF-19) | 0.00, as | 3.82, ftr | 4.32, ftr |
| PET (92LBT)/PE (GF-19) | 0.00, as | 3.07, ftr | 3.42, ftr |
| Nylon/PE (GF-19) | 0.00, as | 3.35, ftr | 3.74, ftr |
| PET-Met/PE (GF-19) | 0.00, as | 4.11, ftr | 4.66, ftr |
| OPP-Met/PE (GF-19) | 0.00, as | 1.99, ftr | 2.33, ftr |
| OPP-Met/CoexPP (70SPW) | 0.00, as | 1.88, ftr | 1.97, ftr |
| Backed Foil/Nylon | 0.00, as | 0.96, at, sec | 1.13, at, sec |
| Backed Foil/PET (92LBT) | 0.00, as | 0.65, at, sec | 0.83, at, sec |
| Backed Foil/3 mil CPP | 0.00, as | 1.44, at, sec | 1.83, at, sec |
| PET (92LBT)/3 mil CPP | 0.00, as | 1.86, ftr | 2.57, ftr |
| Nylon/3 mil CPP | 0.00, as | 3.15, ftr | 3.58, ftr |

The pot-life viscosity for the neat adhesive (no solvent) system was determined at 40° C.: Initial viscosity: 2112.5 mPa*s, Viscosity at 10 mins.: 2025.0 mPa*s, Viscosity at 15 mins.: 1950.0 mPa*s, Viscosity at 20 mins: 1912.5 mPa*s, Viscosity at 30 mins.: 1900.0 mPa*s, Viscosity at 40 mins: 1900.0 mPa*s, Viscosity at 60 mins.: 1887.5 mPa*s.

Comparative Example 28

Polyester Resin of Example 17 was evaluated with at a mix ratio of Desmodur N3300: Polyester Resin of 100:86.8 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.69, ftr | 2.29, ftr | 1.14, ftr |
| CoexPP (75SLP)/PE (GF-19) | 5.78, ftr | 3.92, ftr | 5.30, ftr |
| PET (92LBT)/PE (GF-19) | 6.05, ftr | 3.54, ftr | 3.36, ftr |
| Nylon/PE (GF-19) | 5.81, ftr | 6.52, ftr | 5.26, ftr |
| PET-Met/PE (GF-19) | 3.54, ftr | 2.28, ftr | 2.92, ftr |
| OPP-Met/PE (GF-19) | 5.70, ftr | 3.02, ftr | 4.33, ftr |
| OPP-Met/CoexPP (70SPW) | 2.91, ftr | 2.89, ftr | 1.64, ftr |
| Backed Foil/Nylon | 0.95, as | 0.67, as | 0.66, as |
| Backed Foil/PET (92LBT) | 0.70, as | 0.32, as | 0.44, as |
| Backed Foil/PE (GF-19) | 1.26, as | 0.78, as | 2.03, as |
| PET (92LBT)/Backed Foil | 1.07, as | 0.53, as | 0.30, as |

The pot-life viscosity for the neat adhesive (no solvent) system was determined at 40° C.: Initial viscosity: 637.5 mPa*s, Viscosity at 10 mins.: 600.0 mPa*s, Viscosity at 15 mins.: 612.5 mPa*s, Viscosity at 20 mins: 1825.0 mPa*s, Viscosity at 30 mins.: 5000.0 mPa*s, Viscosity at 40 mins: >12500 mPa*s, Viscosity at 60 mins.: >12500 mPa*s.

Comparative Example 29

Polyester Resin of Example 17 was evaluated with at a mix ratio of Desmodur N3300: Polyester Resin of 100:82.2 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.14, ftr | 2.08, ftr | 1.39, ftr |
| CoexPP (75SLP)/PE (GF-19) | 4.25, ftr | 3.10, ftr | 4.22, ftr |
| PET (92LBT)/PE (GF-19) | 4.67, ftr | 2.93, ftr | 3.19, ftr |
| Nylon/PE (GF-19) | 5.22, ftr | 2.09, ftr | 3.91, ftr |
| PET-Met/PE (GF-19) | 3.08, ftr | 1.74, ftr | 2.20, ftr |
| OPP-Met/PE (GF-19) | 4.76, ftr | 2.35, ftr | 3.23, ftr |
| OPP-Met/CoexPP (70SPW) | 2.18, ftr | 2.28, ftr | 1.21, ftr |
| Backed Foil/Nylon | 0.86, as | 0.58, as | 0.48, as |
| Backed Foil/PET (92LBT) | 0.66, as | 0.34, as | 0.39, as |
| Backed Foil/PE (GF-19) | 1.09, as | 0.58, as | 0.67, as |
| PET (92LBT)/Backed Foil | 0.64, as | 0.36, as | 0.21, as |

The pot-life viscosity for the neat adhesive (no solvent) system was determined at 40° C.: Initial viscosity: 637.5 mPa*s, Viscosity at 10 mins.: 612.5 mPa*s, Viscosity at 15 mins.: 1075.0 mPa*s, Viscosity at 20 mins: 1925.0 mPa*s, Viscosity at 30 mins.: 5475.0 mPa*s, Viscosity at 40 mins: >12500 mPa*s, Viscosity at 60 mins.: >12500 mPa*s.

Comparative Example 30

Polyester Resin of Example 20 was evaluated with at a mix ratio of Desmodur N3300: Polyester Resin of 100:102.6 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.79, ftr | 1.37, ftr | 2.44, ftr |
| CoexPP (75SLP)/PE (GF-19) | 2.68, ftr | 3.01, ftr | 5.07, ftr |
| PET (92LBT)/PE (GF-19) | 2.74, as | 2.96, as | 3.58, as |
| Nylon/PE (GF-19) | 1.54, ftr | 3.54, ftr | 5.06, ftr |
| PET-Met/PE (GF-19) | 1.31, as | 1.30, ftr | 1.65, ftr |
| OPP-Met/PE (GF-19) | 1.12, as | 1.13, ftr | 2.13, ftr |
| OPP-Met/CoexPP (70SPW) | 0.92, as | 1.20, pmt, as | 1.43, pmt, as |
| Backed Foil/Nylon | 1.90, as | 1.23, as | 2.31, ftr |
| Backed Foil/PET (92LBT) | 3.96, as | 0.89, as | 1.93, ftr |
| Backed Foil/3 mil CPP | 1.62, as | 5.61, as | 4.37, ftr |
| PET (92LBT)/3 mil CPP | 1.57, as | 5.13, ftr | 3.72, ftr |
| Nylon/3 mil CPP | 2.37, as | 2.13, ftr | 3.88, ftr |

The pot-life viscosity for the neat adhesive (no solvent) system was determined at 40° C.: Initial viscosity: 2087.5 mPa*s, Viscosity at 10 mins.: 1987.5 mPa*s, Viscosity at 15 mins.: 1862.5 mPa*s, Viscosity at 20 mins: 1825.0 mPa*s, Viscosity at 30 mins.: 1712.5 mPa*s, Viscosity at 40 mins: 1612.5 mPa*s, Viscosity at 60 mins.: 1975.0 mPa*s.

Comparative Example 31

Polyester Resin of Example 20 was evaluated with at a mix ratio of Desmodur N3300: Polyester Resin of 100:97.3 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.38, ftr | 1.19, ftr | 1.89, ftr |
| CoexPP (75SLP)/PE (GF-19) | 1.81, ftr | 2.27, ftr | 4.10, ftr |
| PET (92LBT)/PE (GF-19) | 2.03, as | 2.52, as | 3.21, as |
| Nylon/PE (GF-19) | 1.15, ftr | 2.75, as | 3.83, ftr |
| PET-Met/PE (GF-19) | 0.77, as | 0.76, pmt, as | 1.31, ftr |
| OPP-Met/PE (GF-19) | 0.83, as | 1.06, pmt, as | 1.36, pmt, as |
| OPP-Met/CoexPP (70SPW) | 0.84, as | 1.07, pmt, as | 1.31, pmt, as |
| Backed Foil/Nylon | 1.39, as | 1.21, as | 1.77, ftr |
| Backed Foil/PET (92LBT) | 1.56, as | 0.97, as | 1.56, ftr |
| Backed Foil/3 mil CPP | 2.70, as | 3.22, as | 3.31, ftr |
| PET (92LBT)/3 mil CPP | 1.31, as | 4.12, ftr | 2.97, ftr |
| Nylon/3 mil CPP | 2.25, as | 1.62, ftr | 2.60, ftr |

The pot-life viscosity for the neat adhesive (no solvent) system was determined at 40° C.: Initial viscosity: 2162.5 mPa*s, Viscosity at 10 mins.: 2062.5 mPa*s, Viscosity at 15 mins.: 1950.0 mPa*s, Viscosity at 20 mins: 1887.5 mPa*s, Viscosity at 30 mins.: 1725.0 mPa*s, Viscosity at 40 mins: 1612.5 mPa*s, Viscosity at 60 mins.: 1950.0 mPa*s.

Comparative Example 32

Polyester Resin of Example 21 was evaluated with at a mix ratio of Desmodur N3300: Polyester Resin of 100:102.1 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 2.45, ftr | 1.59, ftr | 1.60, ftr |
| CoexPP (75SLP)/PE (GF-19) | 3.53, ftr | 2.69, ftr | 3.84, ftr |
| PET (92LBT)/PE (GF-19) | 3.71. as | 2.66, ftr | 1.83, ftr |
| Nylon/PE (GF-19) | 3.09, ftr | 2.53, ftr | 1.65, ftr |
| PET-Met/PE (GF-19) | 1.89, ftr | 2.95, ftr | 2.23, ftr |
| OPP-Met/PE (GF-19) | 1.36, as | 1.18, pmt, as | 2.11, ftr |
| OPP-Met/CoexPP (70SPW) | 1.29, as | 1.39, ftr | 1.85, ftr |
| Backed Foil/Nylon | 1.55, as | 1.40, ftr | 2.04, as |
| Backed Foil/PET (92LBT) | 0.97, as | 0.92, as | 0.74, as |
| Backed Foil/3 mil CPP | 4.29, as | 1.76, as | 4.93, as |
| PET (92LBT)/3 mil CPP | 4.60, ftr | 3.97, ftr | 3.44, ftr |
| Nylon/3 mil CPP | 3.24, as | 5.05, ftr | 4.69, ftr |

The pot-life viscosity for the neat adhesive (no solvent) system was determined at 40° C.: Initial viscosity: 2162.5 mPa*s, Viscosity at 10 mins.: 2037.5 mPa*s, Viscosity at 15 mins.: 1925.0 mPa*s, Viscosity at 20 mins: 1887.5 mPa*s, Viscosity at 30 mins.: 1812.5 mPa*s, Viscosity at 40 mins: 1725.0 mPa*s, Viscosity at 60 mins.: 1762.5 mPa*s.

Comparative Example 33

Polyester Resin of Example 21 was evaluated with at a mix ratio of Desmodur N3300: Polyester Resin of 100:96.8 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 2.09, ftr | 1.34, ftr | 1.23, ftr |
| CoexPP (75SLP)/PE (GF-19) | 2.87, ftr | 2.05, ftr | 3.01, ftr |
| PET (92LBT)/PE (GF-19) | 3.02, as | 1.92, ftr | 1.38, ftr |
| Nylon/PE (GF-19) | 2.60, ftr | 2.20, ftr | 1.27, ftr |
| PET-Met/PE (GF-19) | 1.40, ftr | 2.50, ftr | 1.71, ftr |
| OPP-Met/PE (GF-19) | 1.23, as | 0.90, pmt, as | 1.65, ftr |
| OPP-Met/CoexPP (70SPW) | 1.19, as | 1.10, pmt, as | 1.55, ftr |
| Backed Foil/Nylon | 0.93, as | 1.20, ftr | 1.46, as |
| Backed Foil/PET (92LBT) | 0.70, as | 0.84, as | 0.71, as |
| Backed Foil/3 mil CPP | 2.32, as | 1.50, as | 3.66, as |
| PET (92LBT)/3 mil CPP | 3.13, ftr | 2.55, ftr | 2.09, ftr |
| Nylon/3 mil CPP | 2.14, ftr | 3.63, ftr | 2.86, ftr |

The pot-life viscosity for the neat adhesive (no solvent) system was determined at 40° C.: Initial viscosity: 2187.5 mPa*s, Viscosity at 10 mins.: 2087.5 mPa*s, Viscosity at 15 mins.: 1975.0 mPa*s, Viscosity at 20 mins: 1925.0 mPa*s, Viscosity at 30 mins.: 1850.0 mPa*s, Viscosity at 40 mins: 1737.5 mPa*s, Viscosity at 60 mins.: 1700.0 mPa*s.

Example 34

Polyester-Carbonate-Polyol Resin of Example 8 was evaluated with at a mix ratio of Desmodur N3300: Polyester-Carbonate-Polyol Resin of 100:89.4 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 2.77, ftr | 1.59, ftr | 1.68, ftr |
| CoexPP (75SLP)/PE (GF-19) | 2.52, ftr | 7.70, fstr, ftr | 3.14, ftr |
| PET (92LBT)/PE (GF-19) | 2.05, ftr | 5.60, fstr. ftr | 3.51, ftr |
| Nylon/PE (GF-19) | 4.74, ftr | 6.36, fstr, ftr | 3.86, ftr |
| PET-Met/PE (GF-19) | 2.11, ftr | 4.39, fstr, ftr | 2.66, ftr |
| OPP-Met/PE (GF-19) | 4.23, ftr | 5.07, fstr, ftr | 3.71, ftr |
| OPP-Met/CoexPP (70SPW) | 2.49, ftr | 2.57, ftr | 1.79, ftr |
| Backed Foil/Nylon | 1.14, as | 0.72, at, sec | 0.96, at, sec |
| Backed Foil/PET (92LBT) | 2.32, as | 1.18, at, sec | 1.13, at, sec |
| Backed Foil/3 mil CPP | 1.86, as | 2.37, at, sec | 2.36, at, sec |
| PET (92LBT)/3 mil CPP | 1.78, as | 3.17, fstr, ftr | 2.64, ftr |
| Nylon/3 mil CPP | 4.01, ftr | 7.86, fstr. ftr | 3.39, ftr |

The pot-life viscosity for the neat adhesive (no solvent) system was determined at 40° C.: Initial viscosity: 800.0 mPa*s, Viscosity at 10 mins.: 3825.0 mPa*s, Viscosity at 15 mins.: >12187.5 mPa*s, Viscosity at 20 mins: >12500 mPa*s, Viscosity at 30 mins.: >12500 mPa*s, Viscosity at 40 mins: >12500 mPa*s, Viscosity at 60 mins.: >12500 mPa*s.

Example 35

Polyester-Carbonate-Polyol Resin of Example 8 was evaluated with at a mix ratio of Desmodur N3300: Polyester-Carbonate-Polyol Resin of 100:84.7 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.94, ftr | 1.53, ftr | 1.70, ftr |
| CoexPP (75SLP)/PE (GF-19) | 2.11, ftr | 6.56, fstr, ftr | 2.32, ftr |
| PET (92LBT)/PE (GF-19) | 1.73, as | 4.79, fstr, ftr | 2.98, ftr |
| Nylon/PE (GF-19) | 3.43, ftr | 5.15, fstr, ftr | 3.09, ftr |
| PET-Met/PE (GF-19) | 1.64, ftr | 4.22, fstr, ftr | 2.69, ftr |
| OPP-Met/PE (GF-19) | 3.77, ftr | 4.99, fstr, ftr | 3.20, ftr |
| OPP-Met/CoexPP (70SPW) | 1.91, ftr | 3.05, ftr | 1.72, ftr |
| Backed Foil/Nylon | 0.70, as | 1.21, at, sec | 1.10, at, sec |
| Backed Foil/PET (92LBT) | 2.12, as | 1.86, at, sec | 0.95, at, sec |
| Backed Foil/3 mil CPP | 1.33, as | 1.83, at, sec | 1.77, at, sec |
| PET (92LBT)/3 mil CPP | 1.68, as | 2.39, fstr, ftr | 2.12, ftr |
| Nylon/3 mil CPP | 3.49, ftr | 5.81, fstr, ftr | 2.93, ftr |

The pot-life viscosity for the neat adhesive (no solvent) system was determined at 40° C.: Initial viscosity: 812.5 mPa*s, Viscosity at 10 mins.: 2737.5 mPa*s, Viscosity at 15 mins.: 6400.0 mPa*s, Viscosity at 20 mins: >12500 mPa*s, Viscosity at 30 mins.: >12500 mPa*s, Viscosity at 40 mins: >12500 mPa*s, Viscosity at 60 mins.: >12500 mPa*s.

Example 36

Polyester-Carbonate-Polyol Resin of Example 9 was evaluated with at a mix ratio of Desmodur N3300: Polyester-Carbonate-Polyol Resin of 100:86.2 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.73, ftr | 1.98, ftr | 2.55, ftr |
| CoexPP (75SLP)/PE (GF-19) | 5.90, fstr, as | 6.42, fstr, ftr | 6.05, ftr |
| PET (92LBT)/PE (GF-19) | 1.90, as | 2.11, as | 3.30, ftr |
| Nylon/PE (GF-19) | 5.04, ftr | 6.78, fstr, ftr | 5.31, ftr |
| PET-Met/PE (GF-19) | 5.25, ftr | 2.71, as | 4.45, ftr |
| OPP-Met/PE (GF-19) | 5.52, ftr | 6.67, fstr, ftr | 4.61, ftr |
| OPP-Met/CoexPP (70SPW) | 2.46, ftr | 3.43, ftr | 1.92, ftr |
| Backed Foil/Nylon | 0.44, as | 0.46, at, sec | 0.22, at, sec |
| Backed Foil/PET (92LBT) | 0.72, as | 1.04, at, sec | 0.82, at, sec |
| Backed Foil/3 mil CPP | 1.77, as | 2.65, at, sec | 1.74, at, sec |
| PET (92LBT)/3 mil CPP | 0.93, as | 1.52, fstr, ftr | 4.08, ftr |
| Nylon/3 mil CPP | 5.84, ftr | 2.97, as | 5.44, ftr |

The pot-life viscosity for the neat adhesive (no solvent) system was determined at 40° C.: Initial viscosity: 1150.0 mPa*s, Viscosity at 10 mins.: >12500 mPa*s, Viscosity at 15 mins.: >12500 mPa*s, Viscosity at 20 mins: >12500 mPa*s, Viscosity at 30 mins.: >12500 mPa*s, Viscosity at 40 mins: >12500 mPa*s, Viscosity at 60 mins.: >12500 mPa*s.

Example 37

Polyester-Carbonate-Polyol Resin of Example 9 was evaluated with a Desmodur N3300 at a mix ratio of Polyester-Carbonate-Polyol Resin of 100:81.5 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.40, ftr | 2.00, ftr | 2.11, ftr |
| CoexPP (75SLP)/PE (GF-19) | 3.63, as | 6.04, fstr, ftr | 5.54, ftr |
| PET (92LBT)/PE (GF-19) | 1.34, as | 1.87, as | 2.98, ftr |
| Nylon/PE (GF-19) | 3.69, ftr | 5.52, fstr, ftr | 4.91, ftr |
| PET-Met/PE (GF-19) | 4.03, ftr | 4.26, as | 4.13, ftr |
| OPP-Met/PE (GF-19) | 3.90, ftr | 5.15, fstr, ftr | 4.16, ftr |
| OPP-Met/CoexPP (70SPW) | 1.76, as | 3.01, ftr | 2.09, ftr |
| Backed Foil/Nylon | 0.75, as | 0.57, at, sec | 0.22, at, sec |
| Backed Foil/PET (92LBT) | 0.81, as | 0.96, at, sec | 0.27, at, sec |
| Backed Foil/3 mil CPP | 1.52, as | 2.09, at, sec | 2.19, at, sec |
| PET (92LBT)/3 mil CPP | 0.82, as | 1.15, fstr, ftr | 2.67, ftr |
| Nylon/3 mil CPP | 2.33, as | 2.79, as | 4.20, ftr |

The pot-life viscosity for the neat adhesive (no solvent) system was determined at 40° C.: Initial viscosity: 912.5 mPa*s, Viscosity at 10 mins.: 7325.0 mPa*s, Viscosity at 15 mins.: >12500 mPa*s, Viscosity at 20 mins: >12500 mPa*s, Viscosity at 30 mins.: >12500 mPa*s, Viscosity at 40 mins: >12500 mPa*s, Viscosity at 60 mins.: >12500 mPa*s.

Example 38

Polyester-Carbonate-Polyol Resin of Example 10 was evaluated with a Desmodur N3300 with a mix ratio of Polyester-Carbonate-Polyol Resin of 100:108.0 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.82, ftr | 2.62, ftr | 1.72, ftr |
| CoexPP (75SLP)/PE (GF-19) | 6.50, fstr, as | 2.02, ftr | 1.98, ftr |
| PET (92LBT)/PE (GF-19) | 1.30, as | 6.60, ftr | 3.32, ftr |
| Nylon/PE (GF-19) | 4.08, ftr | 7.07, ftr | 4.00, ftr |
| PET-Met/PE (GF-19) | 5.03, ftr | 4.92, ftr | 6.00, ftr |
| OPP-Met/PE (GF-19) | 3.06, ftr | 5.59, ftr | 4.67, ftr |
| OPP-Met/CoexPP (70SPW) | 2.04, ftr | 3.77, ftr | 1.04, ftr |
| Backed Foil/Nylon | 1.75, as | 1.27, at, sec | 0.97, at, sec |
| Backed Foil/PET (92LBT) | 1.90, as | 0.93, at, sec | 0.32, at, sec |
| Backed Foil/3 mil CPP | 3.23, as | 2.28, at, sec | 2.16, at, sec |
| PET (92LBT)/3 mil CPP | 2.36, ftr | 5.20, ftr | 5.34, ftr |
| Nylon/3 mil CPP | 7.86, ftr | 11.91, ftr | 3.69, ftr |

The pot-life viscosity for the neat adhesive (no solvent) system was determined at 40° C.: Initial viscosity: 1337.5 mPa*s, Viscosity at 10 mins.: 1325.0 mPa*s, Viscosity at 15 mins.: 1450.0 mPa*s, Viscosity at 20 mins: 1650.0 mPa*s, Viscosity at 30 mins.: 2275.0 mPa*s, Viscosity at 40 mins: 3350.0 mPa*s, Viscosity at 60 mins.: >12500 mPa*s.

Example 39

Polyester-Carbonate-Polyol Resin of Example 10 was evaluated with a Desmodur N3300 at a mix ratio of Polyester-Carbonate-Polyol Resin of 100:102.3 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.34, ftr | 2.06, ftr | 1.20, ftr |
| CoexPP (75SLP)/PE (GF-19) | 2.73, as | 3.46, ftr | 2.05, ftr |
| PET (92LBT)/PE (GF-19) | 1.81, as | 5.99, ftr | 3.14, ftr |
| Nylon/PE (GF-19) | 3.19, ftr | 4.96, ftr | 3.76, ftr |
| PET-Met/PE (GF-19) | 4.16, ftr | 3.71, ftr | 4.26, ftr |
| OPP-Met/PE (GF-19) | 2.40, ftr | 4.95, ftr | 4.03, ftr |
| OPP-Met/CoexPP (70SPW) | 1.39, ftr | 3.36, ftr | 1.08, ftr |
| Backed Foil/Nylon | 1.52, as | 1.06, at, sec | 1.21, at, sec |
| Backed Foil/PET (92LBT) | 1.47, as | 0.90, at, sec | 1.25, at, sec |
| Backed Foil/3 mil CPP | 2.76, as | 2.69, at, sec | 2.49, at, sec |
| PET (92LBT)/3 mil CPP | 2.10, ftr | 4.57, ftr | 5.01, ftr |
| Nylon/3 mil CPP | 3.77, as | 7.58, ftr | 3.80, ftr |

The pot-life viscosity for the neat adhesive (no solvent) system was determined at 40° C.: Initial viscosity: 1162.5 mPa*s, Viscosity at 10 mins.: 1150.0 mPa*s, Viscosity at 15 mins.: 1250.0 mPa*s, Viscosity at 20 mins: 1450.0 mPa*s, Viscosity at 30 mins.: 2037.5 mPa*s, Viscosity at 40 mins: 3787.0 mPa*s, Viscosity at 60 mins.: >12500 mPa*s.

Example 40

Polyester-Carbonate-Polyol Resin of Example 11 was evaluated with a Desmodur N3300 at a mix ratio of Polyester-Carbonate-Polyol Resin of 100:107.0 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.49, ftr | 2.28, ftr | 1.84, ftr |
| CoexPP (75SLP)/PE (GF-19) | 4.10, ftr | 3.72, ftr | 3.11, ftr |
| PET (92LBT)/PE (GF-19) | 1.35, as | 2.97, ftr | 2.88, ftr |
| Nylon/PE (GF-19) | 3.28, ftr | 4.99, ftr | 4.39, ftr |
| PET-Met/PE (GF-19) | 3.65, ftr | 4.95, ftr | 4.22, ftr |
| OPP-Met/PE (GF-19) | 2.17, ftr | 4.46, ftr | 1.07, ftr |
| OPP-Met/CoexPP (70SPW) | 1.49, ftr | 3.87, ftr | 3.70, ftr |
| Backed Foil/Nylon | 1.08, as | 1.79, at, sec | 1.54, at, sec |
| Backed Foil/PET (92LBT) | 1.39, as | 3.11, at, sec | 2.86, at, sec |
| Backed Foil/3 mil CPP | 2.27, as | 2.41, at, sec | 2.99, at, sec |
| PET (92LBT)/3 mil CPP | 1.40, ftr | 5.04, ftr | 4.89, ftr |
| Nylon/3 mil CPP | 3.81, ftr | 6.39, ftr | 6.13, ftr |

The pot-life viscosity for the neat adhesive (no solvent) system was determined at 40° C.: Initial viscosity: 1275.0 mPa*s, Viscosity at 10 mins.: 1262.5 mPa*s, Viscosity at 15 mins.: 1350.0 mPa*s, Viscosity at 20 mins: 1487.5 mPa*s, Viscosity at 30 mins.: 1900.0 mPa*s, Viscosity at 40 mins: 2462.5 mPa*s, Viscosity at 60 mins.: 9925.0 mPa*s.

Example 41

Polyester-Carbonate-Polyol Resin of Example 11 was evaluated with a Desmodur N3300 at a mix ratio of Polyester-Carbonate-Polyol Resin of 100:101.4 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| | Bond Strength (N/15 mm) | | |
|---|---|---|---|
| Laminate Structure | 1 Day | 7 Days | 14 Days |
| CoexPP (75SLP)/CoexPP (70SPW) | 1.27, ftr | 1.93, ftr | 1.77, ftr |
| CoexPP (75SLP)/PE (GF-19) | 3.46, ftr | 3.13, ftr | 2.97, ftr |
| PET (92LBT)/PE (GF-19) | 1.27, as | 2.78, ftr | 2.60, ftr |
| Nylon/PE (GF-19) | 3.05, ftr | 4.06, ftr | 3.80, ftr |
| PET-Met/PE (GF-19) | 3.34, ftr | 4.44, ftr | 4.25, ftr |
| OPP-Met/PE (GF-19) | 2.04, ftr | 4.11, ftr | 4.02, ftr |
| OPP-Met/CoexPP (70SPW) | 1.76, ftr | 3.32, ftr | 3.09, ftr |
| Backed Foil/Nylon | 0.73, as | 1.55, at, sec | 1.30, at, sec |
| Backed Foil/PET (92LBT) | 1.34, as | 2.73, at, sec | 2.63, at, sec |
| Backed Foil/3 mil CPP | 1.40, as | 2.69, at, sec | 2.30, at, sec |
| PET (92LBT)/3 mil CPP | 1.30, ftr | 4.42, ftr | 4.19, ftr |
| Nylon/3 mil CPP | 1.13, ftr | 4.43, ftr | 4.20, ftr |

The pot-life viscosity for the neat adhesive (no solvent) system was determined at 40° C.: Initial viscosity: 1237.5 mPa*s, Viscosity at 10 mins.: 1212.5 mPa*s, Viscosity at 15 mins.: 1262.5 mPa*s, Viscosity at 20 mins: 1375.0 mPa*s, Viscosity at 30 mins.: 1750.0 mPa*s, Viscosity at 40 mins: 2300.0 mPa*s, Viscosity at 60 mins.: >12500 mPa*s.

Example 42

Polyester-Carbonate-Polyol Resin of Example 16 was evaluated with a Desmodur N3300 at a mix ratio of Polyester-Carbonate-Polyol Resin of 100:101.5 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| | Bond Strength (N/15 mm) | | |
|---|---|---|---|
| Laminate Structure | 1 Day | 7 Days | 14 Days |
| CoexPP (75SLP)/CoexPP (70SPW) | 2.77, ftr | 1.76, ftr | 1.63, ftr |
| CoexPP (75SLP)/PE (GF-19) | 7.34, ftr | 6.81, ftr | 3.91, ftr |
| PET (92LBT)/PE (GF-19) | 2.25, as | 6.95, ftr | 3.45, as |
| Nylon/PE (GF-19) | 1.93, ftr | 3.91, ftr | 4.44, ftr |
| PET-Met/PE (GF-19) | 2.96, ftr | 2.20, ftr | 3.28, ftr |
| OPP-Met/PE (GF-19) | 3.09, ftr | 3.55, ftr | 3.09, ftr |
| OPP-Met/CoexPP (70SPW) | 2.03, ftr | 1.93, ftr | 1.28, ftr |
| Backed Foil/Nylon | 0.57, as | 1.18, as | 0.96, as |
| Backed Foil/PET (92LBT) | 0.58, as | 0.36, as | 1.17, as |
| Backed Foil/3 mil CPP | 1.01, as | 0.44, as | 0.00, as |
| PET (92LBT)/3 mil CPP | 0.71, as | 2.88, ftr | 5.67, ftr |
| Nylon/3 mil CPP | 1.36, as | 1.58, as | 4.19, ftr |

The pot-life viscosity for the neat adhesive (no solvent) system was determined at 40° C.: Initial viscosity: 1612.5 mPa*s, Viscosity at 10 mins.: 1500.0 mPa*s, Viscosity at 15 mins.: 1337.5 mPa*s, Viscosity at 20 mins: 1312.5 mPa*s, Viscosity at 30 mins.: 1412.5 mPa*s, Viscosity at 40 mins: 1550.0 mPa*s, Viscosity at 60 mins.: 1950.0 mPa*s.

Example 43

Polyester-Carbonate-Polyol Resin of Example 16 was evaluated with a of Desmodur N3300 at a mix ratio of Polyester-Carbonate-Polyol Resin of 100:96.2 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| | Bond Strength (N/15 mm) | | |
|---|---|---|---|
| Laminate Structure | 1 Day | 7 Days | 14 Days |
| CoexPP (75SLP)/CoexPP (70SPW) | 2.03, ftr | 1.51, ftr | 1.33, ftr |
| CoexPP (75SLP)/PE (GF-19) | 6.02, ftr | 5391, ftr | 2.90, ftr |
| PET (92LBT)/PE (GF-19) | 2.03, as | 6.36, ftr | 2.73, ftr |
| Nylon/PE (GF-19) | 1.51, ftr | 2.15, ftr | 3.23, ftr |
| PET-Met/PE (GF-19) | 2.32, ftr | 1.91, ftr | 2.68, ftr |
| OPP-Met/PE (GF-19) | 2.28, ftr | 2.35, ftr | 2.59, ftr |
| OPP-Met/CoexPP (70SPW) | 1.65, ftr | 1.81, ftr | 1.25, ftr |
| Backed Foil/Nylon | 0.66, as | 1.02, as | 1.25, as |
| Backed Foil/PET (92LBT) | 0.33, as | 0.53, as | 0.97, as |
| Backed Foil/3 mil CPP | 0.78, as | 0.44, as | 0.00, as |
| PET (92LBT)/3 mil CPP | 1.09, as | 2.33, ftr | 4.22, ftr |
| Nylon/3 mil CPP | 1.95, as | 1.21, as | 2.21, ftr |

The pot-life viscosity for the neat adhesive (no solvent) system was determined at 40° C.: Initial viscosity: 1675.0 mPa*s, Viscosity at 10 mins.: 1575.0 mPa*s, Viscosity at 15 mins.: 1425.0 mPa*s, Viscosity at 20 mins: 1387.5 mPa*s, Viscosity at 30 mins.: 1450.0 mPa*s, Viscosity at 40 mins: 1587.5 mPa*s, Viscosity at 60 mins.: 1937.5 mPa*s.

Example 44

Polyester-Carbonate-Polyol Resin of Example 12 was evaluated with a Desmodur N3300 at a mix ratio of Polyester-Carbonate-Polyol Resin of 100:86.1 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| | Bond Strength (N/15 mm) | | |
|---|---|---|---|
| Laminate Structure | 1 Day | 7 Days | 14 Days |
| CoexPP (75SLP)/CoexPP (70SPW) | 1.53, ft | 2.77, ft | 2.28, ft |
| CoexPP (75SLP)/PE (GF-19) | 2.10, ft | 4.23, ft | 4.04, ft |
| PET (92LBT)/PE (GF-19) | 2.90, ft | 4.43, ft | 4.31, ft |
| Nylon/PE (GF-19) | 2.81, ft | 3.37, ft | 5.82, ft |
| PET-Met/PE (GF-19) | 0.70, as | 0.68, ft | 0.58, ft |
| OPP-Met/PE (GF-19) | 0.69, as | 0.48, as | 0.80, as |
| OPP-Met/CoexPP (70SPW) | 0.72, as | 0.97, as | 0.99, as |
| Backed Foil/Nylon | 0.17, as | 1.18, as | 0.74, as |
| Backed Foil/PET (92LBT) | 0.64, as | 0.30, as | 0.30, as |
| Backed Foil/3 mil CPP | 1.63, as | 0.89, as | 2.27, as |
| PET (92LBT)/3 mil CPP | 3.41, ft | 3.01, ft | 3.07, ft |
| Nylon/3 mil CPP | 2.06, ft | 6.20, ft | 5.47, ft |

The pot-life viscosity for the neat adhesive (no solvent) system was determined at 40° C.: Initial viscosity: 862.5 mPa*s, Viscosity at 10 mins.: 875.0 mPa*s, Viscosity at 15 mins.: 962.5 mPa*s, Viscosity at 20 mins: 1087.5 mPa*s, Viscosity at 30 mins.: 1525.0 mPa*s, Viscosity at 40 mins: 4375.0 mPa*s, Viscosity at 60 mins.: >12500 mPa*s.

Example 45

Polyester-Carbonate-Polyol Resin of Example 12 was evaluated with a Desmodur N3300 at a mix ratio of Polyester-Carbonate-Polyol Resin of 100:81.6 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 0.60, as | 2.28, ft | 1.99, ft |
| CoexPP (75SLP)/PE (GF-19) | 0.67, as | 3.08, ft | 2.90, ft |
| PET (92LBT)/PE (GF-19) | 0.62, as | 3.06, ft | 2.97, ft |
| Nylon/PE (GF-19) | 0.47, as | 2.85, ft | 2.65, ft |
| PET-Met/PE (GF-19) | 0.47, as | 0.45, as | 0.22, as |
| OPP-Met/PE (GF-19) | 0.55, as | 0.38, as | 0.46, as |
| OPP-Met/CoexPP (70SPW) | 0.54, as | 0.97, as | 0.74, as |
| Backed Foil/Nylon | 0.00, as | 0.80, as | 0.68, as |
| Backed Foil/PET (92LBT) | 0.47, as | 0.20, as | 0.17, as |
| Backed Foil/3 mil CPP | 1.10, as | 1.10, as | 1.50, as |
| PET (92LBT)/3 mil CPP | 1.12, ft | 1.72, ft | 2.13, ft |
| Nylon/3 mil CPP | 0.33, as | 3.62, ft | 3.09, ft |

The pot-life viscosity for the neat adhesive (no solvent) system was determined at 40° C.: Initial viscosity: 850.0 mPa*s, Viscosity at 10 mins.: 825.0 mPa*s, Viscosity at 15 mins.: 862.5 mPa*s, Viscosity at 20 mins: 937.5 mPa*s, Viscosity at 30 mins.: 1075.0 mPa*s, Viscosity at 40 mins: 1250.0 mPa*s, Viscosity at 60 mins.: 2012.5 mPa*s.

Example 46

Polyester-Carbonate-Polyol Resin of Example 13 was evaluated with a Desmodur N3300 at a mix ratio of Polyester-Carbonate-Polyol Resin of 100:145.3 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.69, ft | 3.03, ft | 2.33, ft |
| CoexPP (75SLP)/PE (GF-19) | 3.66, ft | 2.66, ft | 4.01, ft |
| PET (92LBT)/PE (GF-19) | 2.70, ft | 2.35, ft | 1.72, as |
| Nylon/PE (GF-19) | 3.43, ft | 4.25, ft | 3.11, ft |
| PET-Met/PE (GF-19) | 0.52, as | 0.46, as | 0.36, as |
| OPP-Met/PE (GF-19) | 0.58, as | 0.41, as | 0.49, as |
| OPP-Met/CoexPP (70SPW) | 0.54, as | 0.59, as | 0.55, as |
| Backed Foil/Nylon | 0.59, as | 0.67, as | 0.35, as |
| Backed Foil/PET (92LBT) | 0.52, as | 0.57, as | 0.42, as |
| Backed Foil/3 mil CPP | 0.72, as | 1.61, as | 1.18, as |
| PET (92LBT)/3 mil CPP | 1.92, ft | 1.63, ft | 2.49, as |
| Nylon/3 mil CPP | 2.26, ft | 2.52, as | 2.07, as |

The pot-life viscosity for the neat adhesive (no solvent) system was determined at 40° C.: Initial viscosity: 1375.0 mPa*s, Viscosity at 10 mins.: 2175.0 mPa*s, Viscosity at 15 mins.: 3500.0 mPa*s, Viscosity at 20 mins.: 5500.0 mPa*s, Viscosity at 30 mins.: >12500 mPa*s, Viscosity at 40 mins: >12500 mPa*s, Viscosity at 60 mins.: >12500 mPa*s.

Example 47

Polyester-Carbonate-Polyol Resin of Example 13 was evaluated with a Desmodur N3300 at a mix ratio of Polyester-Carbonate-Polyol Resin of 100:137.7 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.50, ft | 2.62, ft | 1.92, ft |
| CoexPP (75SLP)/PE (GF-19) | 2.25, ft | 2.26, ft | 3.24, ft |
| PET (92LBT)/PE (GF-19) | 1.47, as | 1.70, as | 1.48, as |
| Nylon/PE (GF-19) | 2.04, ft | 2.90, ft | 2.61, ft |
| PET-Met/PE (GF-19) | 0.67, as | 0.39, as | 0.24, as |
| OPP-Met/PE (GF-19) | 0.44, as | 0.28, as | 0.38, as |
| OPP-Met/CoexPP (70SPW) | 0.43, as | 0.64, as | 0.36, as |
| Backed Foil/Nylon | 0.36, as | 0.41, as | 0.26, as |
| Backed Foil/PET (92LBT) | 0.45, as | 0.38, as | 0.26, as |
| Backed Foil/3 mil CPP | 0.60, as | 0.65, as | 0.55, as |
| PET (92LBT)/3 mil CPP | 1.66, as | 1.41, as | 1.65, as |
| Nylon/3 mil CPP | 2.45, as | 1.99, as | 1.65, as |

The pot-life viscosity for the neat adhesive (no solvent) system was determined at 40° C.: Initial viscosity: 1475.0 mPa*s, Viscosity at 10 mins.: 3075.0 mPa*s, Viscosity at 15 mins.: 5837.5 mPa*s, Viscosity at 20 mins: 10862.5 mPa*s, Viscosity at 30 mins.: >12500 mPa*s, Viscosity at 40 mins: >12500 mPa*s, Viscosity at 60 mins.: >12500 mPa*s.

Example 48

Polyester-Carbonate-Polyol Resin of Example 14 was evaluated with a Desmodur N3300 at a mix ratio of Polyester-Carbonate-Polyol Resin of 100:173.5 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 2.98, ft | 1.38, ft | 1.47, ft |
| CoexPP (75SLP)/PE (GF-19) | 3.05, ft | 6.25, ft | 4.98, ft |
| PET (92LBT)/PE (GF-19) | 2.99, ft | 4.74, ft | 2.46, ft |
| Nylon/PE (GF-19) | 3.47, ft | 6.91, ft | 3.57, ft |
| PET-Met/PE (GF-19) | 0.40, as | 0.30, as | 0.23, as |
| OPP-Met/PE (GF-19) | 0.47, as | 0.42, as | 0.35, as |
| OPP-Met/CoexPP (70SPW) | 0.36, as | 0.52, as | 0.40, as |
| Backed Foil/Nylon | 0.96, as | 0.33, as | 0.30, as |
| Backed Foil/PET (92LBT) | 0.89, as | 0.21, as | 0.19, as |
| Backed Foil/3 mil CPP | 1.35, as | 0.93, as | 0.46, as |
| PET (92LBT)/3 mil CPP | 2.13, as | 2.91, as | 2.04, as |
| Nylon/3 mil CPP | 1.64, as | 2.10, as | 1.58, as |

The pot-life viscosity for the neat adhesive (no solvent) system was determined at 40° C.: Initial viscosity: 1100.0 mPa*s, Viscosity at 10 mins.: 1137.5 mPa*s, Viscosity at 15 mins.: 1337.5 mPa*s, Viscosity at 20 mins: 1850.0 mPa*s, Viscosity at 30 mins.: 5000.0 mPa*s, Viscosity at 40 mins: >12500 mPa*s, Viscosity at 60 mins.: >12500 mPa*s.

Example 49

Polyester-Carbonate-Polyol Resin of Example 14 was evaluated with a Desmodur N3300 at a mix ratio of Polyester-Carbonate-Polyol Resin of 100:164.5 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.87, ft | 1.12, ft | 1.16, ft |
| CoexPP (75SLP)/PE (GF-19) | 2.02, ft | 4.06, ft | 2.88, ft |
| PET (92LBT)/PE (GF-19) | 1.41, as | 3.59, ft | 1.38, as |
| Nylon/PE (GF-19) | 2.33, as | 4.99, ft | 1.92, ft |
| PET-Met/PE (GF-19) | 0.47, as | 0.35, as | 0.00, as |
| OPP-Met/PE (GF-19) | 0.38, as | 0.25, as | 0.22, as |
| OPP-Met/CoexPP (70SPW) | 0.32, as | 0.39, as | 0.31, as |
| Backed Foil/Nylon | 0.63, as | 0.19, as | 0.21, as |
| Backed Foil/PET (92LBT) | 0.65, as | 0.12, as | 0.00, as |
| Backed Foil/3 mil CPP | 1.06, as | 0.68, as | 0.27, as |
| PET (92LBT)/3 mil CPP | 1.73, as | 2.09, ft | 1.42, as |
| Nylon/3 mil CPP | 1.31, as | 1.88, as | 1.28, as |

The pot-life viscosity for the neat adhesive (no solvent) system was determined at 40° C.: Initial viscosity: 1625.0 mPa*s, Viscosity at 10 mins.: 1800.0 mPa*s, Viscosity at 15 mins.: 2400.0 mPa*s, Viscosity at 20 mins: 4500.0 mPa*s, Viscosity at 30 mins.: >12500 mPa*s, Viscosity at 40 mins: >12500 mPa*s, Viscosity at 60 mins.: >12500 mPa*s.

Example 50

Polyester-Carbonate-Polyol Resin of Example 15 was evaluated with a Desmodur N3300 at a mix ratio of Polyester-Carbonate-Polyol Resin of 100:165.2 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.91, ft | 2.51, ft | 2.08, ft |
| CoexPP (75SLP)/PE (GF-19) | 3.08, ft | 3.73, ft | 3.37, ft |
| PET (92LBT)/PE (GF-19) | 1.87, as | 2.14, as | 1.64, as |
| Nylon/PE (GF-19) | 2.04, as | 1.94, as | 4.00, ft |
| PET-Met/PE (GF-19) | 0.44, as | 0.25, as | 0.00, as |
| OPP-Met/PE (GF-19) | 0.26, as | 0.25, as | 0.52, as |
| OPP-Met/CoexPP (70SPW) | 0.65, as | 0.55, as | 0.39, as |
| Backed Foil/Nylon | 1.18, as | 0.18, as | 0.38, as |
| Backed Foil/PET (92LBT) | 0.91, as | 0.25, as | 0.27, as |
| Backed Foil/3 mil CPP | 0.51, as | 0.21, as | 0.14, as |
| PET (92LBT)/3 mil CPP | 0.85, as | 1.23, as | 1.19, as |
| Nylon/3 mil CPP | 0.90, as | 1.92, as | 2.04, as |

The pot-life viscosity for the neat adhesive (no solvent) system was determined at 40° C.: Initial viscosity: 1587.5 mPa*s, Viscosity at 10 mins.: 1487.5 mPa*s, Viscosity at 15 mins.: 1600.0 mPa*s, Viscosity at 20 mins.: 1837.5 mPa*s, Viscosity at 30 mins.: 3212.5 mPa*s, Viscosity at 40 mins: 6612.5 mPa*s, Viscosity at 60 mins.: >12500 mPa*s.

Example 51

Polyester-Carbonate-Polyol Resin of Example 15 was evaluated with a Desmodur N3300 at a mix ratio of Polyester-Carbonate-Polyol Resin of 100:156.6 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.21, ft | 1.67, ft | 1.53, ft |
| CoexPP (75SLP)/PE (GF-19) | 1.55, as | 2.27, ft | 1.82, ft |
| PET (92LBT)/PE (GF-19) | 1.26, as | 1.92, as | 1.54, as |
| Nylon/PE (GF-19) | 1.21, as | 1.31, as | 1.52, as |
| PET-Met/PE (GF-19) | 0.21, as | 0.00, as | 0.00, as |
| OPP-Met/PE (GF-19) | 0.35, as | 0.00, as | 0.00. as |
| OPP-Met/CoexPP (70SPW) | 0.46, as | 0.35, as | 0.30, as |
| Backed Foil/Nylon | 0.92, as | 0.00, as | 0.00, as |
| Backed Foil/PET (92LBT) | 0.75, as | 0.19, as | 0.13, as |
| Backed Foil/3 mil CPP | 0.25, as | 0.14, as | 0.17, as |
| PET (92LBT)/3 mil CPP | 0.50, as | 0.79, as | 0.71, as |
| Nylon/3 mil CPP | 0.47, as | 0.99, as | 0.68, as |

The pot-life viscosity for the neat adhesive (no solvent) system was determined at 40° C.: Initial viscosity: 1550.0 mPa*s, Viscosity at 10 mins.: 1537.5 mPa*s, Viscosity at 15 mins.: 1662.5 mPa*s, Viscosity at 20 mins: 1912.5 mPa*s, Viscosity at 30 mins.: 3337.5 mPa*s, Viscosity at 40 mins: 6625.0 mPa*s, Viscosity at 60 mins.: >12500 mPa*s.

Example 52

Polyester/Polyester-Carbonate-Polyol Resin Blend of Example 22 was evaluated with a Desmodur N3300 at a mix ratio of Polyester/Polyester-Carbonate-Polyol Resin Blend of 100:109.4 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.60, ft | 2.52, ft | 2.14, ft |
| CoexPP (75SLP)/PE (GF-19) | 6.09, ft | 4.87, ft | 3.70, ft |
| PET (92LBT)/PE (GF-19) | 5.18, as | 5.49, ft | 2.27, as |
| Nylon/PE (GF-19) | 5.59, ft | 3.34, ft | 4.09, ft |
| PET-Met/PE (GF-19) | 4.09, ft | 3.11, ft | 3.16, ft |
| OPP-Met/PE (GF-19) | 3.16, ft | 3.13, ft | 2.44, ft |
| OPP-Met/CoexPP (70SPW) | 2.41, ft | 2.83, ft | 1.76, t |
| Backed Foil/Nylon | 0.57, as | 0.98, as | 1.06, as |
| Backed Foil/PET (92LBT) | 0.59, as | 1.05, ft | 0.73, as |
| Backed Foil/3 mil CPP | 0.54, as | 2.38, as | 3.26, as |
| PET (92LBT)/3 mil CPP | 1.72, as | 2.61, ft | 1.93, ft |
| Nylon/3 mil CPP | 2.47, as | 13.16, ft | 7.45, ft |

The pot-life viscosity for the neat adhesive (no solvent) system was determined at 40° C.: Initial viscosity: 2237.5 mPa*s, Viscosity at 10 mins.: 2100.0 mPa*s, Viscosity at 15 mins.: 2012.5 mPa*s, Viscosity at 20 mins: 1987.5 mPa*s, Viscosity at 30 mins.: 1950.0 mPa*s, Viscosity at 40 mins: 1912.5 mPa*s, Viscosity at 60 mins.: 1825.0 mPa*s.

Example 53

Polyester/Polyester-Carbonate-Polyol Resin Blend of Example 22 was evaluated with a Desmodur N3300 at a mix ratio of Polyester/Polyester-Carbonate-Polyol Resin Blend of 100:103.7 from a 50% Ethyl Acetate solution to yield a coating weight of 1.0 lbs/rm (1.6276 g/m$^2$) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 1.29, ft | 2.08, ft | 1.80, ft |
| CoexPP (75SLP)/PE (GF-19) | 5.22, ft | 5.00, ft | 4.03, ft |
| PET (92LBT)/PE (GF-19) | 2.15, as | 4.97, ft | 2.66, ft |
| Nylon/PE (GF-19) | 4.18, ft | 3.08, ft | 3.33, ft |
| PET-Met/PE (GF-19) | 3.37, ft | 2.28, ft | 2.74, ft |
| OPP-Met/PE (GF-19) | 2.22, ft | 3.27, ft | 2.63, ft |
| OPP-Met/CoexPP (70SPW) | 2.01, ft | 2.46, ft | 1.90, ft |
| Backed Foil/Nylon | 0.37, as | 0.99, as | 0.76, as |
| Backed Foil/PET (92LBT) | 0.57, as | 0.97, ft | 1.07, ft |
| Backed Foil/3 mil CPP | 0.33, as | 2.35, as | 2.68, as |
| PET (92LBT)/3 mil CPP | 1.42, as | 2.37, ft | 1.53, ft |
| Nylon/3 mil CPP | 2.02, as | 10.10, ft | 6.18, ft |

The pot-life viscosity for the neat adhesive (no solvent) system was determined at 40° C.: Initial viscosity: 2062.5 mPa*s, Viscosity at 10 mins.: 1962.5 mPa*s, Viscosity at 15 mins.: 1875.0 mPa*s, Viscosity at 20 mins: 1837.5 mPa*s, Viscosity at 30 mins.: 1825.0 mPa*s, Viscosity at 40 mins: 1800.0 mPa*s, Viscosity at 60 mins.: 1725.0 mPa*s.

Example 54

Polyester/Polyester-Carbonate-Polyol Resin Blend of Example 23 was evaluated with a Desmodur N3300 at a mix ratio of Polyester/Polyester-Carbonate-Polyol Resin Blend of 100:109.2 from a 50% Ethyl Acetate solution to yield a coating weight of 1.0 lbs/rm (1.6276 g/m²) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 3.06, ft | 2.10, ft | 2.21, ft |
| CoexPP (75SLP)/PE (GF-19) | 5.06, ft | 6.05, ft | 3.66, ft |
| PET (92LBT)/PE (GF-19) | 3.55, ft | 3.13, ft | 2.62, ft |
| Nylon/PE (GF-19) | 6.25, ft | 5.34, ft | 4.81, ft |
| PET-Met/PE (GF-19) | 3.03, ft | 2.10, ft | 4.99, ft |
| OPP-Met/PE (GF-19) | 4.91, ft | 3.09, ft | 3.86, ft |
| OPP-Met/CoexPP (70SPW) | 2.47, ft | 2.01, ft | 1.33, ft |
| Backed Foil/Nylon | 1.01, as | 1.20, as | 0.39, as |
| Backed Foil/PET (92LBT) | 1.12, as | 1.97, ft | 1.06, as |
| Backed Foil/3 mil CPP | 1.96, as | 2.26, as | 2.22, as |
| PET (92LBT)/3 mil CPP | 4.08, ft | 5.33, ft | 3.75, ft |
| Nylon/3 mil CPP | 3.60, ft | 7.97, ft | 4.48, ft |

The pot-life viscosity for the neat adhesive (no solvent) system was determined at 40° C.: Initial viscosity: 2075.0 mPa*s, Viscosity at 10 mins.: 1950.0 mPa*s, Viscosity at 15 mins.: 1850.0 mPa*s, Viscosity at 20 mins: 1812.5 mPa*s, Viscosity at 30 mins.: 1787.5 mPa*s, Viscosity at 40 mins: 1737.5 mPa*s, Viscosity at 60 mins.: 1637.5 mPa*s.

Example 55

Polyester/Polyester-Carbonate-Polyol Resin Blend of Example 23 was evaluated with a Desmodur N3300 at a mix ratio of Polyester/Polyester-Carbonate-Polyol Resin Blend of 100:103.5 from a 50% Ethyl Acetate solution to yield a coating weight of 1.0 lbs/rm (1.6276 g/m²) and cured at ambient temperature (ca. 45° C.). The bond strength was examined as a function of curing time and is reported below.

| Laminate Structure | Bond Strength (N/15 mm) | | |
|---|---|---|---|
| | 1 Day | 7 Days | 14 Days |
| CoexPP (75SLP)/CoexPP (70SPW) | 2.48, ft | 1.62, ft | 2.03, ft |
| CoexPP (75SLP)/PE (GF-19) | 4.16, ft | 4.99, ft | 3.02, ft |
| PET (92LBT)/PE (GF-19) | 2.85, ft | 2.88, ft | 2.35, ft |
| Nylon/PE (GF-19) | 5.00, ft | 4.05, ft | 3.68, ft |
| PET-Met/PE (GF-19) | 2.23, ft | 2.04, ft | 4.09, ft |
| OPP-Met/PE (GF-19) | 3.99, ft | 2.55, ft | 3.01, ft |
| OPP-Met/CoexPP (70SPW) | 1.94, ft | 1.35, ft | 1.66, ft |
| Backed Foil/Nylon | 0.85, as | 1.02, as | 0.76, as |
| Backed Foil/PET (92LBT) | 1.22, ft | 1.61, ft | 1.27, ft |
| Backed Foil/3 mil CPP | 1.33, as | 2.47, as | 2.05, as |
| PET (92LBT)/3 mil CPP | 3.44, ft | 4.26, ft | 3.94, ft |
| Nylon/3 mil CPP | 3.10, ft | 5.51, ft | 4.54, ft |

The pot-life viscosity for the neat adhesive (no solvent) system was determined at 40° C.: Initial viscosity: 2162.5 mPa*s, Viscosity at 10 mins.: 2050.0 mPa*s, Viscosity at 15 mins.: 1950.0 mPa*s, Viscosity at 20 mins: 1912.5 mPa*s, Viscosity at 30 mins.: 1850.0 mPa*s, Viscosity at 40 mins: 1787.5 mPa*s, Viscosity at 60 mins.: 1687.5 mPa*s.

Test Methods

Viscosity for 100% solid resins is measured by employing a Brookfield RV DV-II+ Viscometer with a thermostated small sample adapter with a spindle #27 and varying the temperature over a range of 25 to 70° C. in increments of 5° C. and allowing the sample to stabilize at temperature for 20 to 30 mins prior to recording viscosity. Viscosity is reported in milliPascal*seconds (mP*s), which is equal to centipoise (cps).

Pot-life and application viscosity of the adhesive system was determined employing a Brookfield RV DV-II+ Viscometer with a thermostated small sample adapter with a spindle #27 with the thermostated cell at a temperature of 50° C. The viscosity is monitored as a function of time, viscosity is reported in milliPascal*seconds (mPa*s); application viscosity is the minimum viscosity measured at 50° C.

Acid Value (AV) is measured by the method of ASTM D3655-06 (American Society for Testing and Materials, West Conshohocken, Pa., USA).

Hydroxyl Number (OHN) is measured by the method of ASTM E1899-08 (American Society for Testing and Materials, West Conshohocken, Pa., USA).

Adhesion bond strengths (T-Peel) were determined on a 15 mm wide×127 cm long strip of laminate on a Thwing-Albert Tensile Tester (Model QC-3A) with a 50 Newton load cell at a 10.0 cm/min rate. The average bond strength of three separate laminates is reported.

Size Exclusion Chromatography (SEC) used two PLgel Mix-B and PLgel Mixed-D columns and Viscotek's triple detector. Polystyrene standards were used to establish a universal calibration curve that determines the weight-averaged and number-averaged molecular weights. The sample was diluted with THF to a polymer concentration of approximately 2.5 mg/ml prior to analysis.

The invention claimed is:
1. A curable formulation comprising
   a polyester-polycarbonate polyol having a polycarbonate functionality in the range of from 10-25%, a hydroxyl number in the range of from 100-250 and a number average molecular weight (Mn) in the range of from 450 to 1200.
2. The curable formulation of claim 1 wherein the curable formulation further comprises a prepolymer selected from the group consisting of an aliphatic isocyanate-terminated prepolymer, an aromatic isocyanate-terminated prepolymer, and combinations thereof.

3. The curable formulation of claim 1 wherein the prepolymer is based upon an isocyanate selected from the group consisting of methylene diphenyl diisocyanate, toluene diisocyanate, hexamethylene diisocyanate, isophorone diisocyanate, xylylene diisocyanate and combinations thereof.

4. The curable formulation of claim 1 wherein the polyester-polycarbonate polyol is derived from a polyester precursor selected from the group consisting of polyester resins based upon ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, isosorbide, trimethylol ethane, trimethylol propane, glycerine, fumaric acid, maleic acid, adipic acid, succinic acid, azelaic acid, sebacic acid, phthalic anhydride, isophthalic acid, terephthalic acid, 1,4-cyclohexanedicarboxylic acid, maleic anhydride, succinic anhydride and combinations thereof.

5. The curable formulation of claim 1 wherein the polyester-polycarbonate polyol is derived from a polyaliphatic carbonate precursor based upon ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, isosorbide and combinations thereof.

6. The curable formulation of claim 1 wherein the polyester-polycarbonate polyol is derived from a glycol precursor selected from the group consisting of ethylene glycol, diethylene glycol, triethylene glycol, tetra-ethylene glycol, propylene glycol, dipropylene glycol, 1,4-butanediol, 2-methyl-1,3-propanediol, neopentyl glycol, 1,6-hexanediol, 1,4-cyclohexanedimethanol, 1,3-cyclohexanedimethanol, isosorbide, and combinations thereof.

7. The curable formulation of claim 4, wherein the polyester-polycarbonate polyol has a structure of

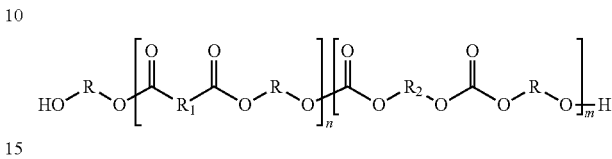

wherein R is a glycol component of the polyester precursor or the glycol precursor, $R_1$ is a dicarboxylic acid component of the polyester precursor, $R_2$ is a glycol component of the polycarbonate precursor, n is from 0 to 10, m is from 0 to 10, and m+n is from 1 to 10.

8. The curable formulation of claim 1 wherein the curable formulation does not contain a solvent.

9. A laminating adhesive prepared from the formulation of claim 1.

10. The laminating adhesive of claim 9, wherein the laminating adhesive has a minimum adhesive bond strength in the range of 1.5 to 5.0 N/15 mm and an application viscosity of ≤6500 mPa*s at 50° C.

* * * * *